US012609081B2

(12) United States Patent
Kim

(10) Patent No.: US 12,609,081 B2
(45) Date of Patent: Apr. 21, 2026

(54) DISPLAY DEVICE AND ELECTRONIC DEVICE HAVING AFTERIMAGE COMPENSATION

(71) Applicant: SAMSUNG DISPLAY CO., LTD., Yongin-si (KR)

(72) Inventor: Gigeun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/915,516

(22) Filed: Oct. 15, 2024

(65) Prior Publication Data

US 2025/0182691 A1 Jun. 5, 2025

(30) Foreign Application Priority Data

Dec. 4, 2023 (KR) ........................ 10-2023-0173198

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/04* (2013.01); *G09G 2310/08* (2013.01); *G09G 2320/0257* (2013.01); *G09G 2320/045* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2230/0257; G09G 2230/0266
USPC ........................................................ 345/76–83
See application file for complete search history.

(56) References Cited

U.S. PATENT DOCUMENTS 7,675,492 B2 3/2010 Park et al.
9,928,773 B2 3/2018 Kim et al.
12,300,149 B2 * 5/2025 Kim .......................... G09G 3/30
2011/0234814 A1 * 9/2011 Kobayashi ............... G09G 5/10 348/E5.062
2016/0111055 A1 * 4/2016 Na ........................ G09G 3/3666 345/94

(Continued)

*Primary Examiner* — Ke Xiao
*Assistant Examiner* — Nelson Lam
(74) *Attorney, Agent, or Firm* — F. CHAU & ASSOCIATES, LLC

(57) ABSTRACT

A display device including: a display panel that includes a plurality of blocks, wherein pixels are arranged in each block; and an afterimage compensation circuit configured to receive input image signals and generate compensation image signals by compensating the input image signals based on deterioration information for each of the plurality of blocks, and wherein the afterimage compensation circuit includes: a nonvolatile memory including a first storage area where deterioration data for each of the plurality of blocks is accumulated at each of a plurality of backup times in a preset backup period, and a second storage area where information about a final backup time among the backup times is stored; and a compensation unit configured to receive accumulated deterioration data stored in the first storage area as the deterioration information and to compensate the input image signals based on the accumulated deterioration data to generate the compensation image signals.

20 Claims, 20 Drawing Sheets

(56) References Cited

U.S. PATENT DOCUMENTS

| | | | | |
|---|---|---|---|---|
| 2021/0056912 | A1* | 2/2021 | Park | G09G 3/2092 |
| 2022/0028327 | A1* | 1/2022 | Bae | G09G 3/3225 |
| 2022/0208056 | A1* | 6/2022 | Baek | G09G 3/20 |
| 2022/0383794 | A1* | 12/2022 | Kim | G09G 3/2007 |
| 2024/0071276 | A1* | 2/2024 | Kim | G09G 3/2003 |
| 2024/0153451 | A1* | 5/2024 | Choi | G06N 20/00 |
| 2024/0194102 | A1* | 6/2024 | Lim | G09G 3/006 |

* cited by examiner

DISPLAY DEVICE AND ELECTRONIC DEVICE HAVING AFTERIMAGE COMPENSATION

CROSS-REFERENCE TO RELATED APPLICATION

This application claims priority under 35 U.S.C. § 119 to Korean Patent Application No. 10-2023-0173198 filed on Dec. 4, 2023, in the Korean Intellectual Property Office, the disclosure of which is incorporated by reference herein in its entirety.

TECHNICAL FIELD

Embodiments of the present disclosure described herein relate to a display device, and more particularly, to a display device that can compensate for afterimages.

DISCUSSION OF RELATED ART

Among display devices, a light-emitting display device utilizes light-emitting diodes that produce light through the recombination of electrons and holes. These devices offer advantages such as fast response speeds and low power consumption.

The light-emitting display device includes a display panel with pixels arranged along data lines and scan lines. Each pixel typically includes a light-emitting diode and a pixel circuit unit that regulates the current flowing through the light-emitting diode. The pixel circuit unit adjusts the current in response to a data signal, resulting in the emission of light with a predetermined luminance corresponding to the current level.

SUMMARY

Embodiments of the present disclosure provide a display device that can effectively compensate for afterimages even when operated at low frequencies.

According to an embodiment of the present disclosure, there is provided a display device including: a display panel that includes a plurality of blocks, wherein a plurality of pixels are arranged in each block; and an afterimage compensation circuit configured to receive input image signals and generate compensation image signals by compensating the input image signals based on deterioration information for each of the plurality of blocks, and wherein the afterimage compensation circuit includes: a nonvolatile memory including a first storage area where deterioration data for each of the plurality of blocks is accumulated at each of a plurality of backup times in a preset backup period, and a second storage area where information about a final backup time among the backup times is stored; and a compensation unit configured to receive accumulated deterioration data stored in the first storage area as the deterioration information and to compensate the input image signals based on the accumulated deterioration data to generate the compensation image signals.

The afterimage compensation circuit further includes: a sampling unit configured to set sampling lines and to sample line image signals from the sampling lines based on the compensation image signals; a data processing unit configured to generate deterioration data for the sampling lines based on the line image signals; and a volatile memory configured to store the deterioration data.

The sampling unit sequentially selects one of the sampling lines in units based on a reference frame.

The reference frame includes one frame.

The final backup time is a last backup time just before a power is turned off, and when the power is turned on, the sampling unit sets a reference sampling line among the sampling lines based on the information about the final backup time, and starts a sampling operation from the reference sampling line.

The information about the final backup time includes a number of a final reference frame at the final backup time, a number of a final sampling line at the final backup time, or a number of blocks included in the final sampling line.

The plurality of blocks are arranged in a first direction and a second direction intersecting the first direction, and the sampling lines extend in the first direction or the second direction.

Each of the plurality of blocks includes a plurality of sub-blocks arranged in the first direction and the second direction, and wherein the sampling unit samples compensation image signals corresponding to first sub-blocks of blocks included in a first sampling line in a first reference frame as a first line image signal, and samples compensation image signals corresponding to first sub-blocks of blocks included in a second sampling line in a second reference frame as a second line image signal.

The deterioration data stored in the volatile memory is backed up to the first storage area of the nonvolatile memory at each of the backup times.

Each of the plurality of blocks includes a plurality of sub-blocks, and wherein the sampling unit performs sampling on one sub-block included in each block located on a selected sampling line among the sampling lines.

The display panel includes: a first display area operating at a first frequency; and a second display area operating at a second frequency lower than the first frequency.

The first display area displays an image in units of first driving frames, the second display area displays an image in units of second driving frames, and the second driving frame includes a full frame and one or more partial frames.

The sampling unit sequentially selects one of the sampling lines in units of a reference frame, and the reference frame is set based on the full frame.

A duration of the backup period varies depending on a time elapsed since a power was turned on.

According to an embodiment of the present disclosure, there is provided a display device including: a display panel that includes a plurality of blocks, wherein a plurality of pixels are arranged in each block; and an afterimage compensation circuit configured to receive input image signals and generate compensation image signals by compensating for the input image signals based on deterioration information for each of the plurality of blocks, and wherein the afterimage compensation circuit includes: a nonvolatile memory where deterioration data for each of the plurality of blocks is accumulated at each of a plurality of backup times in a preset backup period; a compensation unit configured to receive accumulated deterioration data from the nonvolatile memory as the deterioration information and to compensate for the input image signals based on the accumulated deterioration data to generate the compensation image signal; and a backup period adjustment unit configured to vary a duration of the backup period based on a driving frequency of the display panel.

The display panel operates above a reference frequency in a first driving mode, and operates below the reference frequency in a second driving mode, and wherein the backup period adjustment unit adjusts the duration of the backup period in the second driving mode to be greater than the duration of the backup period in the first driving mode.

The display panel includes: a first display area operating at a first frequency; and a second display area operating at a second frequency lower than the first frequency, and wherein the first display area displays an image in units of first driving frames, the second display area displays an image in units of second driving frames, and the second driving frame includes a full frame and one or more partial frames.

The backup period adjustment unit sets the duration of the backup period based on the second frequency.

The afterimage compensation circuit further includes: a sampling unit configured to set sampling lines and to sample line image signals corresponding to the sampling lines by using the compensation image signals; a data processing unit configured to generate deterioration data corresponding to the sampling lines by using the line image signals; and a volatile memory configured to store the deterioration data.

The deterioration data stored in the volatile memory is backed up to the nonvolatile memory at each of the backup times.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
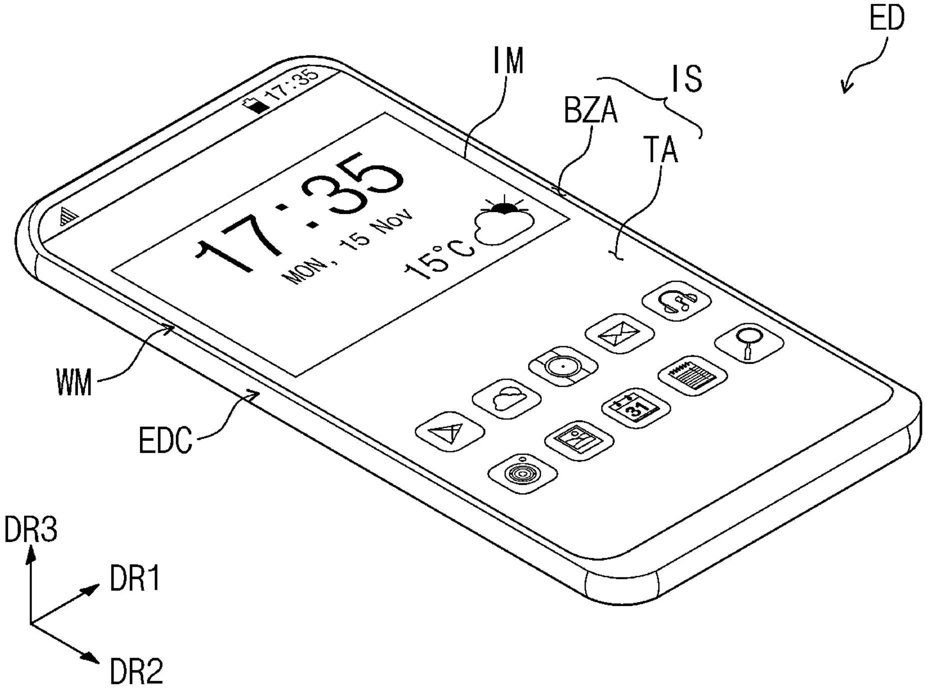
FIG. 1 is a perspective view of an electronic device, according to an embodiment of the present disclosure.

In the specification, when one component (or area, layer, part, etc.) is referred to as being “on”, “connected to”, or “coupled to” another component, it should be understood that the first component may be directly on, connected to, or coupled to the second component, or there may be an intervening component between them.

Like reference numerals refer to similar components. Additionally, in drawings, the thickness, ratio, and dimensions of components are exaggerated for clarity in describing technical contents. The term “and/or” refers to one or more combinations of the associated listed items.

The terms “first”, “second”, etc. are used to describe various components for differentiation purposes, but do not imply any limitations on the components. For example, a component referred to as “first” can be renamed “second,” and vice versa. Unless otherwise specified, singular terms include the plural form.

The terms “under”, “below”, “on”, “above”, etc. are used to describe the positional relationship of components as illustrated in the drawings. These terms are relative and are used with reference to the orientation shown in the drawing.

It will be understood that the terms “include”, “comprise”, “have”, etc. indicate the presence of features, numbers, steps, operations, elements, or components described in the specification, or combinations thereof, without excluding the possibility of additional features, numbers, steps, operations, elements, or components, or combinations thereof.

Unless otherwise defined, all terms (including technical and scientific terms) used herein have the meanings commonly understood by those skilled in the relevant art. In addition, terms defined in commonly used dictionaries should be interpreted consistently with their meaning in the context of the related technology and not as overly formal or idealized definitions unless explicitly defined in the present disclosure.

Hereinafter, embodiments of the present disclosure will be described with reference to the accompanying drawings.

FIG. 1 is a perspective view of an electronic device, according to an embodiment of the present disclosure.

Referring to FIG. 1, an electronic device ED according to an embodiment of the present disclosure may have a rectangular shape having short sides parallel to a first direction DR1 and long sides parallel to a second direction DR2 that intersects the first direction DR1. However, the present disclosure is not limited thereto, and the electronic device ED may have various shapes, such as a circular shape or a polygonal shape.

The electronic device ED may be a device that operates based on an electrical signal. The electronic device ED may encompass various forms and applications. For example, the electronic device ED may be applied to electronic devices such as a smart phone, a smart watch, a tablet, a notebook computer, a computer, a smart television, and a navigation system.

Hereinafter, a normal direction perpendicular to a plane defined by the first direction DR1 and the second direction DR2 is referred to as a third direction DR3. In the present specification, "when viewed in a plan view" refers to the perspective from the third direction DR3.

The upper surface of the electronic device ED may be referred to as a display surface IS and may be parallel to a plane defined by the first direction DR1 and the second direction DR2. Images IM generated by the electronic device ED may be presented to a user through the display surface IS.

The display surface IS may be divided into a transparent area TA and a bezel area BZA. The transparent area TA may be an area where the images IM are displayed, allowing the user to visually perceive them. In this embodiment, the transparent area TA is illustrated as a quadrangle whose vertexes are rounded. However, this is merely an example; the transparent area TA may have various shapes, and is not limited to any one embodiment.

The bezel area BZA is adjacent to the transparent area TA. The bezel area BZA may have a specific color. The bezel area BZA may surround the transparent area TA, thus defining the shape of the transparent area TA. However, the bezel area BZA is illustrated by way of example. The bezel area BZA may be disposed next to only one side of the transparent area TA or may be omitted altogether.

The electronic device ED can detect external inputs from the surrounding environment. These external inputs may include various types, such as physical contact with a part of the user's body, like a hand, or contact with a separate device, such as an active pen or digitizer. Additionally, external inputs can include actions like hovering near the electronic device ED or being adjacent to it at a predetermined distance. The external input may also take various forms, including force, pressure, temperature, and light.

Figure 2A:
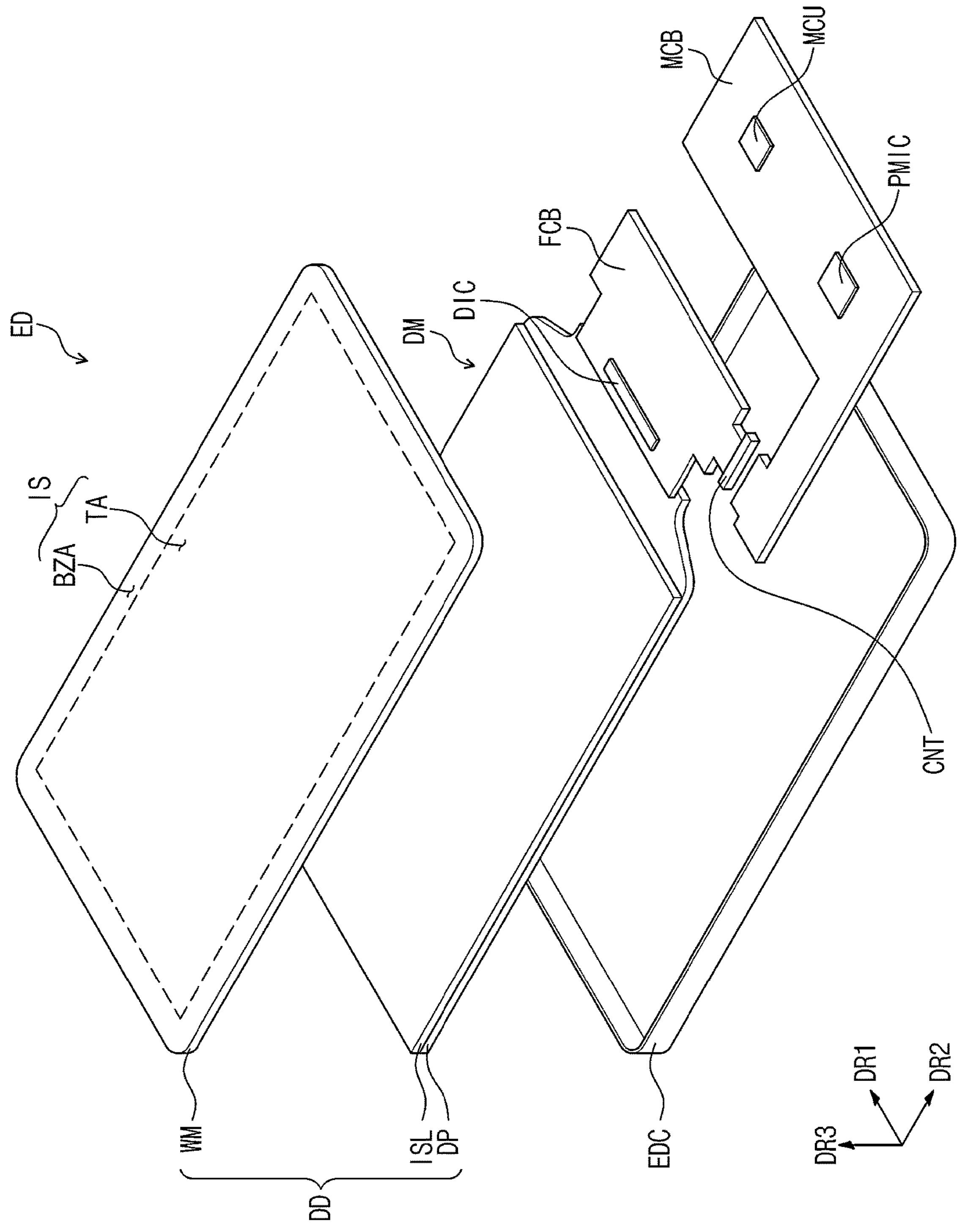
FIG. 2A is an exploded perspective view of an electronic device, according to an embodiment of the present disclosure.
Figure 2B:
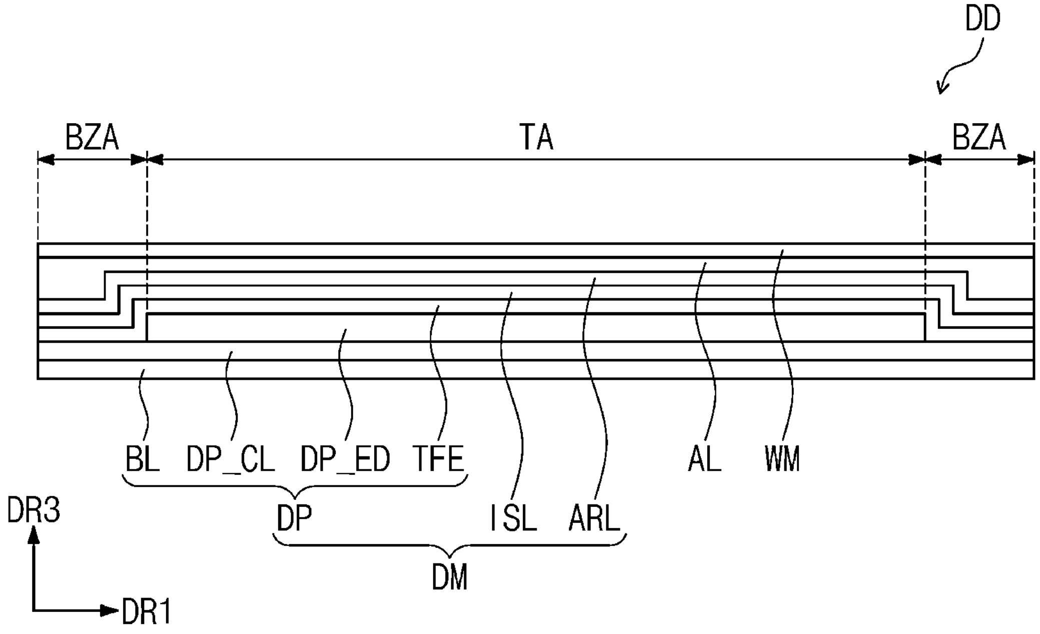
FIG. 2B is a cross-sectional view of a display device, according to an embodiment of the present disclosure.

FIG. 2A is an exploded perspective view of an electronic device, according to an embodiment of the present disclosure, and FIG. 2B is a cross-sectional view of a display device, according to an embodiment of the present disclosure.

Referring to FIGS. 2A and 2B, the electronic device ED may include a display device DD, an electronic module, and a housing EDC. The display device DD may include a window WM and a display module DM, and may be accommodated in the housing EDC. In this embodiment, the window WM and the housing EDC are combined to form the exterior of the electronic device ED.

The front surface of the window WM defines the display surface IS of the electronic device ED. The window WM may include an optically transparent insulating material. For example, the window WM may include glass or plastic. The window WM may have a multi-layer or single-layer structure. For example, the window WM may include a plurality of plastic films bonded to each other by an adhesive or may include a glass substrate and a plastic film bonded to each other by an adhesive.

The display module DM may include a display panel DP and an input sensing layer ISL. The display panel DP may display images according to electrical signals, and the input sensing layer ISL may sense external inputs applied from the outside. The external input may be provided in various forms.

The display panel DP according to an embodiment of the present disclosure may be a light emitting display panel, but is not particularly limited thereto. For example, the display panel DP may be an organic light emitting display panel, an inorganic light emitting display panel, or a quantum dot light emitting display panel. The light emitting layer of the organic light emitting display panel may include an organic light emitting material, and the light emitting layer of the inorganic light emitting display panel may include an inorganic light emitting material. The light emitting layer of the quantum dot light emitting display panel may include quantum dots, quantum rods, etc. Hereinafter, the display panel DP will be described as an organic light emitting display panel.

Referring to FIG. 2B, the display panel DP includes a base layer BL, a circuit layer DP_CL, an element layer DP_ED, and an encapsulation layer TFE. According to the present disclosure, the display panel DP may be a flexible display panel. However, the present disclosure is not limited to this. For example, the display panel DP may be a foldable display panel that is folded about a folding axis or a rigid display panel.

The base layer BL may include a synthetic resin layer. The synthetic resin layer may be a polyimide-based resin layer, and the material of the synthetic resin layer is not specifically limited. As another example, the base layer BL may include a glass substrate, a metal substrate, or an organic/inorganic composite material substrate.

The circuit layer DP_CL is disposed on the base layer BL. The circuit layer DP_CL is disposed between the base layer BL and the element layer DP_ED. The circuit layer DP_CL includes at least one insulating layer and a circuit element. Hereinafter, the insulating layer included in the circuit layer DP_CL is referred to as an intermediate insulating layer. The intermediate insulating layer includes at least one intermediate inorganic layer and at least one intermediate organic layer. The circuit element may include a pixel driving circuit included in each of a plurality of pixels for displaying an image and a sensor driving circuit included in each of a plurality of sensors for recognizing external information. The external information may be biometric information. As an example of the present disclosure, the sensor may be a fingerprint recognition sensor, a proximity sensor, an iris recognition sensor, a blood pressure measurement sensor, or an illumination sensor. In addition, the sensor may be an optical sensor that recognizes biometric information in an optical manner. The circuit layer DP_CL may further include signal lines connected to the pixel driving circuit and/or the sensor driving circuit.

The element layer DP_ED may include a light emitting element included in each pixel and a light receiving element included in each sensor. As an example of the present disclosure, the light receiving element may be a photodiode. The light receiving element may be a sensor that detects or reacts to light reflected by the user's fingerprint. In other words, the light-receiving element may be a sensor designed to detect or respond to light reflected from the user's fingerprint.

The encapsulation layer TFE seals the element layer DP_ED. The encapsulation layer TFE may include at least one organic layer and at least one inorganic layer. The inorganic layer includes an inorganic material and may protect the element layer DP_ED from moisture/oxygen. The inorganic layer may include, but is not particularly limited to, a silicon nitride layer, a silicon oxy nitride layer, a silicon oxide layer, a titanium oxide layer, or an aluminum oxide layer. The organic layer may include an organic material and may protect the element layer DP_ED from foreign substances such as dust particles.

The input sensing layer ISL may be formed on the display panel DP. The input sensing layer ISL may be disposed directly on the encapsulation layer TFE. According to an embodiment of the present disclosure, the input sensing layer ISL may be formed on the display panel DP through a continuous process. For example, when the input sensing layer ISL is directly disposed on the display panel DP, an adhesive film is not disposed between the input sensing layer ISL and the encapsulation layer TFE. Alternatively, an adhesive film may be disposed between the input sensing layer ISL and the display panel DP. In this case, the input sensing layer ISL is not manufactured through a continuous process with the display panel DP, but is manufactured through a separate process from the display panel DP and then may be fixed to the upper surface of the display panel DP with an adhesive film.

The input sensing layer ISL may sense an external input (e.g., a user's touch) and convert it into a predetermined input signal. This signal is then provided to the display panel DP. The input sensing layer ISL may include a plurality of sensing electrodes to sense the external input. The sensing electrodes may sense the external input in a capacitive manner. The display panel DP may receive an input signal from the input sensing layer ISL and may generate an image corresponding to the input signal.

The display module DM may further include an anti-reflection layer ARL. The anti-reflection layer ARL reduces the reflectance of external light incident from the upper side of the window WM. As an example of the present disclosure, the anti-reflection layer ARL may be disposed on the input sensing layer ISL. However, the present disclosure is not limited to this. The anti-reflection layer ARL may be disposed between the display panel DP and the input sensing layer ISL. The anti-reflection layer ARL may include a plurality of color filters and a black matrix. The arrangement of color filters may be determined based on the colors of light generated by a plurality of pixels PX (refer to FIG. 3) included in the display panel DP. Alternatively, the anti-reflection layer ARL may include a phase retarder and a polarizer. The phase retarder may be a retarder of a film type or a liquid crystal coating type and may include a ½ retarder and/or a 2/4 retarder. The polarizer may also be a polarizer of a film type or a liquid crystal coating type. The film type may include a stretch-type synthetic resin film, and the liquid crystal coating type may include liquid crystals arranged in a specific direction. The phase retarder and the polarizer may be implemented with one polarization film.

According to an embodiment of the present disclosure, the display device DD may further include an adhesive layer AL. The window WM may be attached to the anti-reflection layer ARL by the adhesive layer AL. The adhesive layer AL may include an optically clear adhesive, an optically clear adhesive resin, or a pressure sensitive adhesive.

The display module DM may further include a display driving circuit DIC (or a display driving chip) and a flexible circuit film FCB. As an example of the present disclosure, the display driving circuit DIC may be configured in a chip form and may be mounted on the flexible circuit film FCB. However, the present disclosure is not limited to this. Alternatively, the display driving circuit DIC may be disposed on the display panel DP.

The flexible circuit film FCB may be coupled to the display panel DP. The flexible circuit film FCB may be coupled to one end of the display panel DP to electrically connect the display driving circuit DIC to the display panel DP.

The display module DM may be mounted on the flexible circuit film FCB and may further include a touch driving circuit electrically connected to the input sensing layer ISL.

The electronic module may include a main circuit board MCB. As an example of the present disclosure, the main circuit board MCB may be electrically connected to the flexible circuit film FCB through a connector CNT. The main circuit board MCB may be equipped with a main processor MCU and a power management circuit PMIC (or a power management chip). The main processor MCU and power management circuit PMIC may be electrically connected to the display driving circuit DIC through the connector CNT.

The main processor MCU may control the overall operation of the electronic device ED. The main processor MCU may include one or more of a central processing unit CPU and an application processor AP. The main processor MCU may further include one or more of a graphics processing unit, a communication processor, and an image signal processor. The main processor MCU may provide image signals and various control signals necessary for displaying images to the display driving circuit DIC.

The power management circuit PMIC may receive an external power source (e.g., a battery voltage). As an example, the power management circuit PMIC may generate a voltage to be supplied to the display device DD based on an external power source. The power management circuit PMIC may include at least one regulator, which can generate output voltages with various voltage levels based on the external power source.

FIG. 2A illustrates a structure where the power management circuit PMIC is mounted as a chip on the main circuit board MCB, but the present disclosure is not limited thereto. For example, the power management circuit PMIC may be included within the display device DD, such as being mounted as a chip on the flexible circuit film FCB.

In addition to the main circuit board MCB, the main processor MCU, and the power management circuit PMIC, the electronic module may further include various functional modules, such as camera modules and sensor modules.

The housing EDC is combined with the window WM. The housing EDC is combined with the window WM to provide a predetermined internal space. The display device DD and the electronic module may be accommodated in the internal space of the housing EDC. The housing EDC may include a material having a relatively high rigidity. For example, the housing EDC may include a plurality of frames and/or plates made of glass, plastic, metal, or a combination thereof. The housing EDC may reliably protect the components of the display device DD and the electronic module accommodated in the internal space from external impact.

A battery module that supplies the power source required for the overall operation of the display device DD may be disposed between the display module DM and the housing EDC.

Figure 3:
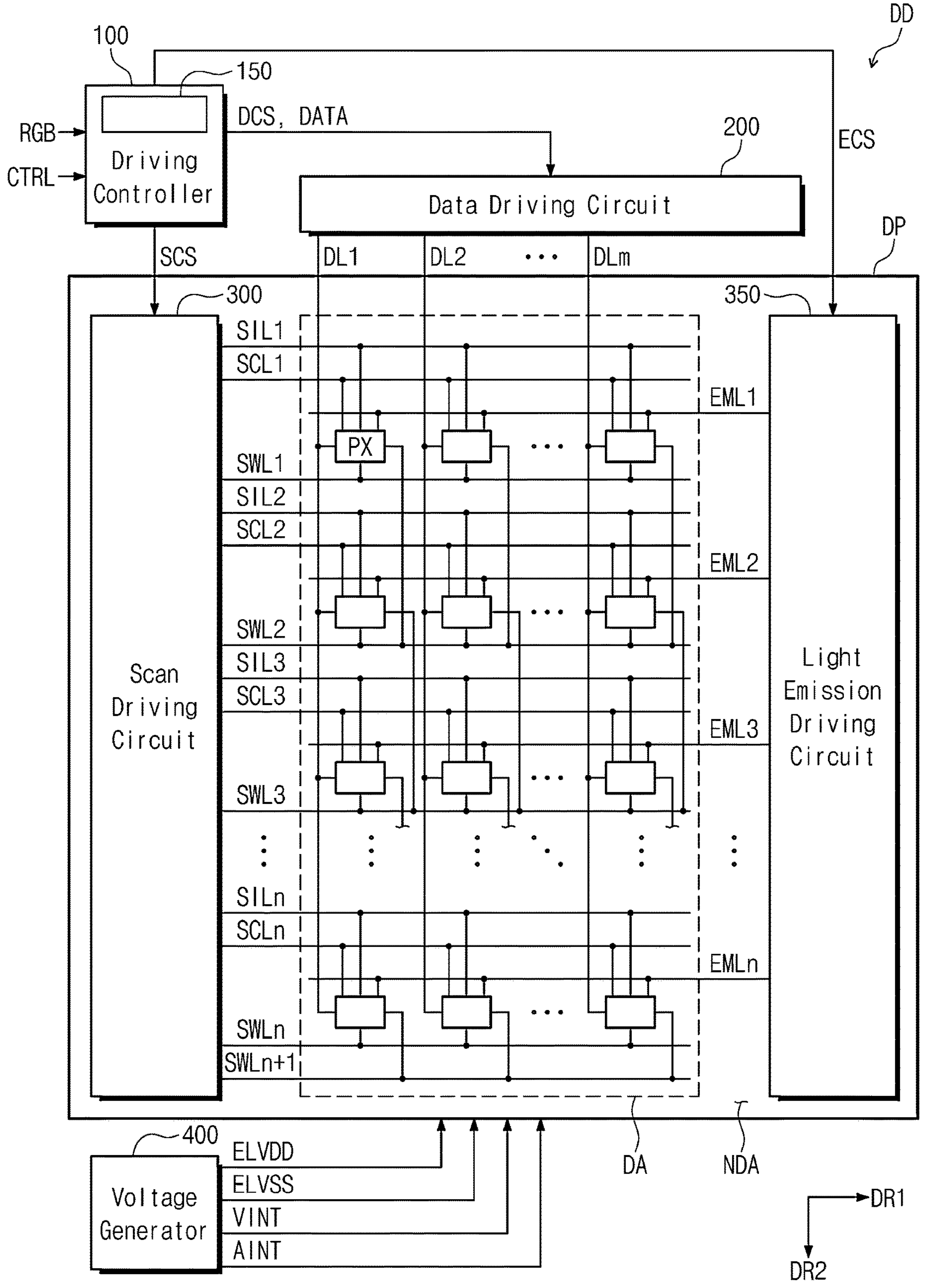
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP, a driving controller 100, a data driving circuit 200, a scan driving circuit 300, a light emission driving circuit 350, and a voltage generator 400.

The driving controller 100 receives input image signals RGB and control signals CTRL from the main processor MCU (refer to FIG. 2A). The control signal CTRL may include a vertical synchronization signal, an input data enable signal, and a master clock signal. The driving controller 100 generates a first driving control signal SCS, a second driving control signal DCS, and a third driving control signal ECS, based on the control signals CTRL. The driving controller 100 may be referred to as a timing controller.

As an example of the present disclosure, the driving controller 100 may include an afterimage compensation circuit 150. The afterimage compensation circuit 150 receives the input image signals RGB, compensates for the input image signals RGB based on deterioration information, and generates a compensation image signal RGB' (refer to FIG. 6). The driving controller 100 generates image data DATA by converting the data format of the compensation image signal RGB' to meet the interface specifications of the data driving circuit 200. FIG. 3 illustrates an example where the afterimage compensation circuit 150 is included in the driving controller 100. However, this is not a limitation; the afterimage compensation circuit 150 can also be configured separately from the driving controller 100.

The data driving circuit 200 receives the second driving control signal DCS and the image data DATA from the driving controller 100. The data driving circuit 200 converts the image data DATA into data signals, and outputs the data signals to a plurality of data lines DL1 to DLm, which will be described later. The data signals are analog voltages corresponding to grayscale values of the image data DATA. Here, "m" is an integer number of 1 or more.

The scan driving circuit 300 receives the first driving control signal SCS from the driving controller 100. The scan driving circuit 300 may output scan signals to scan lines in response to the first driving control signal SCS.

The voltage generator 400 generates voltages to operate the display panel DP. In an embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, light emission control lines EML1 to EMLn, the data lines DL1 to DLm, and the pixels PX. In a display area DA, the initialization scan lines SIL1 to SILn, the compensation scan lines SCL1 to SCLn, the write scan lines SWL1 to SWLn+1, the light emission control lines EML1 to EMLn, the data lines DL1 to DLm, and the pixels PX may overlap each other. The initialization scan lines SIL1 to SILn, the compensation scan lines SCL1 to SCLn, the write scan lines SWL1 to SWLn+1, and the light emission control lines EML1 to EMLn extend in a first direction DR1. The initialization scan lines SIL1 to SILn, the compensation scan lines SCL1 to SCLn, the write scan lines SWL1 to SWLn+1, and the light emission control lines EML1 to EMLn are spaced apart from each other in the second direction DR2. The data lines DL1 to DLm extend in the second direction DR2 and are spaced apart from one another in the first direction DR1. Here, "n" is an integer number of 1 or more.

The plurality of pixels PX are electrically connected to the initialization scan lines SIL1 to SILn, the compensation scan lines SCL1 to SCLn, the write scan lines SWL1 to SWLn+1, the light emission control lines EML1 to EMLn, and the data lines DL1 to DLm, respectively. Each of the plurality of pixels PX may be electrically connected to four scan lines. For example, the pixels of a first row may be connected to the first initialization scan line SIL1, the first compensation scan line SCL1, the first write scan line SWL1, and the second write scan line SWL2. Additionally, the pixels of a second row may be connected to the second initialization scan line SIL2, the second compensation scan line SCL2, the second write scan line SWL2, and the third write scan line SWL3. However, the number of scan lines connected to each pixel PX is not limited to this arrangement and can vary in different configurations. Alternatively, each of the plurality of pixels PX may be electrically connected to five scan lines. In this case, the display panel DP may also include black scan lines.

The scan driving circuit 300 may be disposed in a non-display area NDA of the display panel DP. The scan driving circuit 300 receives the first driving control signal SCS from the driving controller 100. The scan driving circuit 300 outputs initialization scan signals to the initialization scan lines SIL1 to SILn, compensation scan signals to the compensation scan lines SCL1 to SCLn, and write scan signals to the write scan lines SWL1 to SWLn+1, in response to the first driving control signal SCS.

The light emission driving circuit 350 receives the third driving control signal ECS from the driving controller 100. The light emission driving circuit 350 may output light emission control signals to the light emission control lines EML1 to EMLn in response to the third driving control signal ECS. In an embodiment, the scan driving circuit 300 may be connected to the light emission control lines EML1 to EMLn. In this case, the scan driving circuit 300 may output light emission control signals to the light emission control lines EML1 to EMLn.

Each of the plurality of pixels PX includes a light emitting element and a pixel circuit that controls light emission of the light emitting element. The pixel circuit may include a plurality of transistors and a capacitor. The scan driving circuit 300 and the light emission driving circuit 350 may include transistors formed through the same process as the pixel circuit.

Each of the plurality of pixels PX receives the first driving voltage ELVDD, the second driving voltage ELVSS, the first initialization voltage VINT, and the second initialization voltage AINT from the voltage generator 400.

Figure 4:
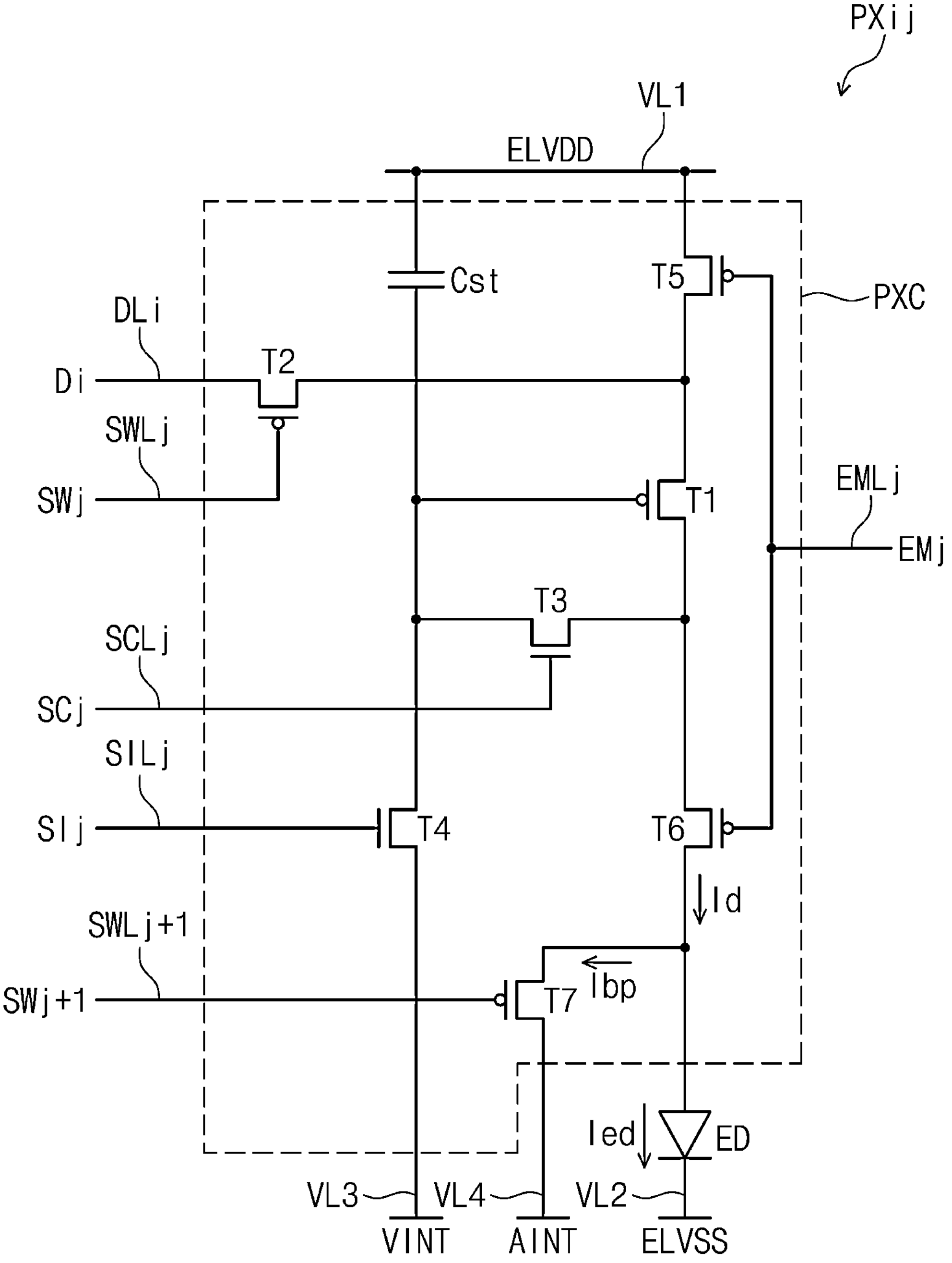
FIG. 4 is a circuit diagram of a pixel, according to an embodiment of the present disclosure.
Figure 5A:
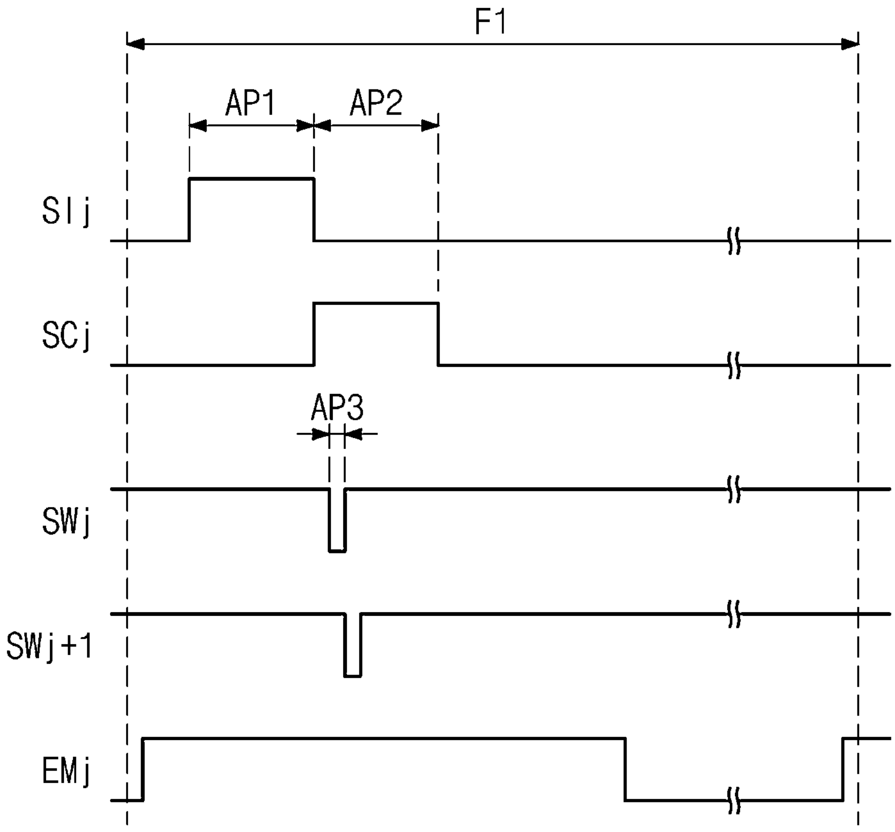
FIG. 5A is a timing diagram for describing an operation of a pixel in a first driving mode, according to an embodiment of the present disclosure.
Figure 5B:
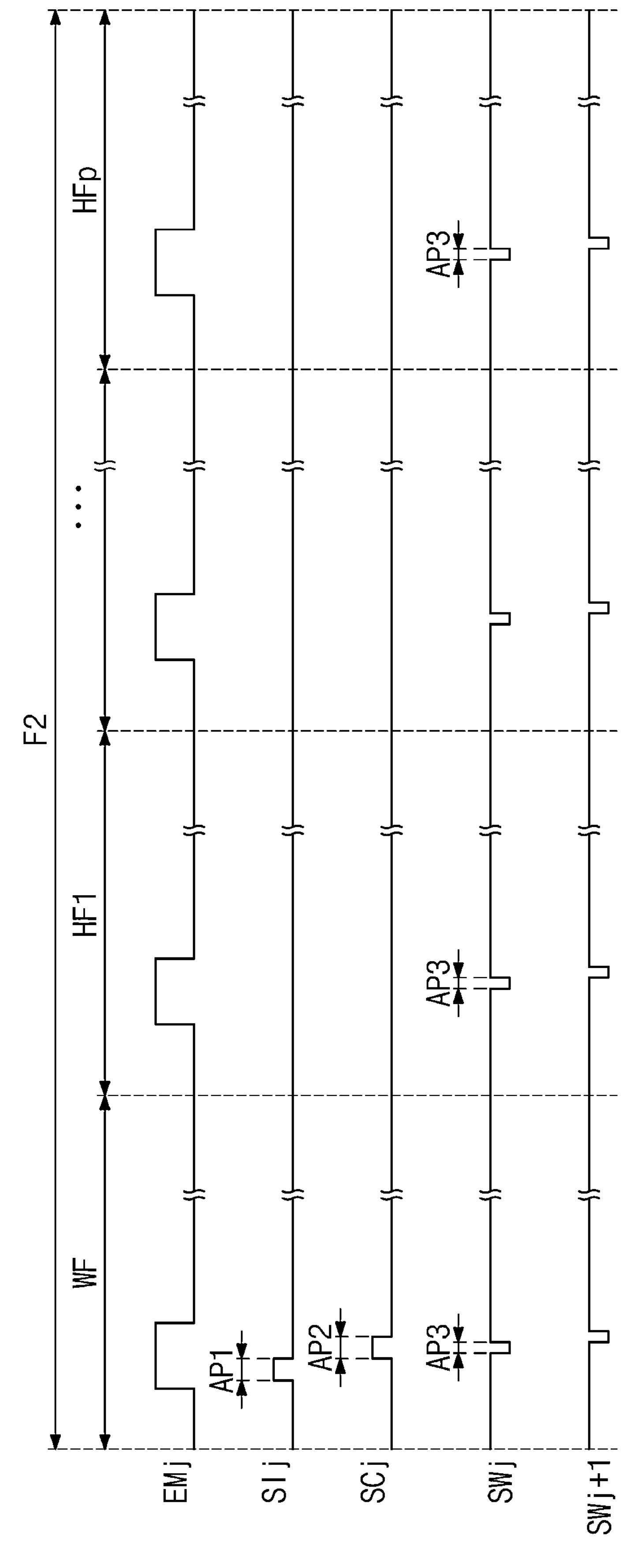
FIG. 5B is a timing diagram for describing an operation of a pixel in a second driving mode, according to an embodiment of the present disclosure.

FIG. 4 is a circuit diagram of a pixel, according to an embodiment of the present disclosure. FIG. 5A is a timing diagram for describing an operation of a pixel in a first driving mode, according to an embodiment of the present disclosure, and FIG. 5B is a timing diagram for describing an operation of a pixel in a second driving mode, according to an embodiment of the present disclosure.

FIG. 4 illustrates an equivalent circuit diagram of one pixel PXij among the plurality of pixels PX illustrated in FIG. 3. Since each of the plurality of pixels has the same circuit structure, only the circuit structure of the pixel PXij will be described, and additional descriptions of the remaining pixels will be omitted to avoid redundancy.

Referring to FIG. 4, the pixel PXij is connected to an i-th data line DLi (hereinafter referred to as a data line) among the data lines DL1 to DLm and a j-th light emission control line EMLj (hereinafter referred to as a light emission control line) among the light emission control lines EML1 to EMLn. The pixel PXij is connected to a j-th initialization scan line SILj (hereinafter referred to as an initialization scan line) among the initialization scan lines SIL1 to SILn, a j-th write scan line SWLj (hereinafter referred to as a first write scan line) among the write scan lines SWL1 to SWLn+1, and a (j+1)-th write scan line SWLj+1 (hereinafter referred to as a second write scan line or a black scan line) among the write scan lines SWL1 to SWLn+1. Additionally, the pixel PXij is connected to a j-th compensation scan line SCLj (hereinafter referred to as a compensation scan line) among the compensation scan lines SCL1 to SCLn. Alternatively, the pixel PXij may be connected to a separate j-th black scan line instead of the (j+1)-th write scan line SWLj+1.

The pixel PXij includes a light emitting element ED and a pixel circuit PXC. The light emitting element ED may include a light emitting diode. The light emitting diode may include an organic light emitting material, an inorganic light emitting material, quantum dots, and quantum rods as the light emitting layer.

The pixel circuit PXC includes first to seventh transistors T1, T2, T3, T4, T5, T6, and T7 and one capacitor Cst. Each of the first to seventh transistors T1 to T7 may be a transistor having a low-temperature polycrystalline silicon (LTPS) semiconductor layer. Some of the first to seventh transistors T1 to T7 may be P-type transistors, while others may be N-type transistors. For example, among the first to seventh transistors T1 to T7, the first, second, and fifth to seventh transistors T1, T2, T5 to T7 may be P-type transistors, and the third and fourth transistors T3 and T4 may be N-type transistors using an oxide semiconductor as the semiconductor layer. However, the configuration of the pixel circuit PXC according to the present disclosure is not limited to the embodiment illustrated in FIG. 4. The pixel circuit PXC illustrated in FIG. 4 is just an example, as the configuration of the pixel circuit PXC may be modified and implemented in various ways. For example, all of the first to seventh transistors T1 to T7 may be P-type transistors or N-type transistors.

The initialization scan line SILj, the compensation scan line SCLj, the first and second write scan lines SWLj and SWLj+1, and the light emission control line EMLj may transfer a j-th initialization scan signal SIj (hereinafter, referred to as an initialization scan signal), a j-th compensation scan signal SCj (hereinafter, referred to as a compensation scan signal), a j-th and (j+1)-th write scan signals SWj and Swj+1 (hereinafter, referred to as first and second write scan signals), and a j-th light emission control signal EMj (hereinafter, referred to as a light emission control signal), respectively, to the pixel PXij. The data line DLi transfers a data signal Di to the pixel Pxij. The data signal Di may have a voltage level corresponding to the grayscale of the associated input image signal among the input image signals RGB received by the display device DD (refer to FIG. 3). First to fourth driving voltage lines VL1, VL2, VL3, and VL4 may transfer the first driving voltage ELVDD, the second driving voltage ELVSS, the first initialization voltage VINT, and the second initialization voltage AINT, respectively, to the pixel Pxij.

The first transistor T1 includes a first electrode connected to the first driving voltage line VL1 through the fifth transistor T5, a second electrode electrically connected to an anode of the light emitting element ED through the sixth transistor T6, and a gate electrode connected to a first end of the capacitor Cst. The first transistor T1 may receive the data signal Di transmitted by the data line DLi based on the switching operation of the second transistor T2, and then supply a driving current Id to the light emitting element ED.

The second transistor T2 includes a first electrode connected to the data line DLi, a second electrode connected to the first electrode of the first transistor T1, and a gate electrode connected to the first write scan line SWLj. The second transistor T2 may be turned by the first write scan signal SWj received through the first write scan line SWLj. Upon activation, the second transistor T2 transfers the data signal Di from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on by the compensation scan signal SCj received through the compensation scan line SCLj. In this case, the gate electrode and the second electrode of the first transistor T1 may be connected to each other such that the first transistor T1 may be diode-connected.

The fourth transistor T4 includes a first electrode connected to the gate electrode of the first transistor T1, a second electrode connected to the third voltage line VL3 to which the first initialization voltage VINT is transferred, and a gate electrode connected to the initialization scan line SILj. The fourth transistor T4 may be turned on by the initialization scan signal SIj received through the initialization scan line SILj. Upon activation, the fourth transistor T4 may initialize a voltage of the gate electrode of the first transistor T1 by transferring the first initialization voltage VINT to the gate electrode of the first transistor T1.

The fifth transistor T5 includes a first electrode connected to the first driving voltage line VL1, a second electrode connected to the first electrode of the first transistor T1, and a gate electrode connected to the light emission control line EMLj.

The sixth transistor T6 includes a first electrode connected to the second electrode of the first transistor T1, a second electrode connected to the anode of the light emitting element ED, and a gate electrode connected to the light emission control line EMLj.

The fifth transistor T5 and the sixth transistor T6 are simultaneously turned on by the light emission control signal EMj received through the light emission control line EMLj. The first driving voltage ELVDD applied through the turned-on fifth transistor T5 may be compensated through the diode-connected first transistor T1 and subsequently transferred to the light emitting element ED.

The seventh transistor T7 includes a first electrode connected to the second electrode of the sixth transistor T6, a second electrode connected to the fourth driving voltage line VL4 to which the second initialization voltage AINT is transferred, and a gate electrode connected to the second write scan line SWLj+1.

As described above, the first end of the capacitor Cst is connected to the gate electrode of the first transistor T1, and a second end of the capacitor Cst is connected to the first driving voltage line VL1. A cathode of the light emitting element ED may be connected to the second driving voltage line VL2 that transfers the second driving voltage ELVSS.

Referring to FIGS. 3, 5A, and 5B, the display device DD may operate in a first driving mode or a second driving mode. The first driving mode may be a driving mode in which the display panel DP operates above a reference frequency, and the second driving mode may be a driving mode in which the display panel DP operates below the reference frequency. For example, the reference frequency may be 60 Hz. The first driving mode can be referred to as a reference driving mode, which operates at a reference frequency, and it can also be a high-frequency driving mode, operating at a higher frequency (e.g., 120 Hz, 240 Hz, or 480 Hz) than the reference frequency. The second driving mode is referred to as a low-frequency driving mode, operating at a lower frequency (e.g., 30 Hz, 10 Hz, 2 Hz, or 1 Hz) than the reference frequency.

In the first driving mode, the display panel DP may display an image for a plurality of first driving frames F1. When the display panel DP operates at a frequency of 60 Hz in the first driving mode, the display panel DP may display 60 images each corresponding to 60 first driving frames F1 for one second.

When the initialization scan signal SIj of a high level is provided through the initialization scan line SILj during an initialization period AP1 of the first driving frame F1, the fourth transistor T4 is turned on in response to the initialization scan signal SIj of the high level. The first initialization voltage VINT is transferred to the gate electrode of the first transistor T1 through the turned-on fourth transistor T4, and a voltage level of the gate electrode of the first transistor T1 is initialized to the first initialization voltage VINT.

Next, when the compensation scan signal SCj of a high level is supplied through the compensation scan line SCLj during a compensation period AP2 of the first driving frame F1, the third transistor T3 is turned on. The compensation period AP2 may not overlap with the initialization period AP1. During the compensation period AP2, the first transistor T1 is diode-connected and is forward biased by the turned-on third transistor T3.

As an example of the present disclosure, an activation period (e.g., a period corresponding to the compensation period AP2) of the compensation scan signal SCj is a period in which the compensation scan signal SCj has a high level, and an activation period (e.g., a period corresponding to the initialization period AP1) of the initialization scan signal SIj is a period in which the initialization scan signal SIj has a high level. The activation period of the compensation scan signal SCj may not overlap with the activation period of the initialization scan signal SIj. The activation period of the initialization scan signal SIj may precede the activation period of the compensation scan signal SCj. When the third and fourth transistors T3 and T4 are P-type transistors, an activation period (e.g., the period corresponding to the compensation period AP2) of the compensation scan signal SCj may be a period in which the compensation scan signal SCj has a low level, and an activation period (e.g., the period corresponding to the initialization period AP1) of the initialization scan signal SIj may be a period in which the initialization scan signal SIj has a low level.

The compensation period AP2 may include a data write period AP3 in which the first write scan signal SWj is generated at a low level. During the data write period AP3, the second transistor T2 is turned on by the first write scan signal SWj of a low level. Accordingly, a compensation voltage Di-Vth, which is obtained by reducing the voltage of the data signal Di supplied from the data line DLi by a threshold voltage Vth of the first transistor T1, is applied to the gate electrode of the first transistor T1. In other words, a potential of the gate electrode of the first transistor T1 may be the compensation voltage Di-Vth.

The first driving voltage ELVDD and the compensation voltage Di-Vth may be applied to the first and second ends of the capacitor Cst, and charges corresponding to a voltage difference between these ends may be stored in the capacitor Cst.

The seventh transistor T7 is turned on by receiving the low-level second write scan signal SWLj+1 through the second write scan line SWLj+1. Some of the driving current Id may be drained through the seventh transistor T7 as a bypass current Ibp.

When the pixel PXij displays a black image, the emission of light by the light emitting element ED can prevent the correct display of the black image, even if the minimum driving current of the first transistor T1 flows as the driving current Id. To address this, the seventh transistor T7 in the pixel PXij according to an embodiment of the present disclosure, may divert a portion of the minimum driving current of the first transistor T1 to an alternate current path, creating the bypass current Ibp. The minimum driving current of the first transistor T1 refers to the current that flows into the first transistor T1 when its gate-source voltage is less than the threshold voltage Vth, effectively turning off the first transistor T1. Under these conditions, the minimum driving current (e.g., current of 10 pA or less) still flows into the first transistor T1 and is transferred to the light emitting element ED, allowing a black grayscale image to be displayed. While the influence of the bypass current Ibp on the minimum driving current is relatively large when displaying a black image, it has little impact on the driving current Id when displaying other images, such as normal or white images. Accordingly, when the black image is displayed, a current (e.g., a light emission current led), which is reduced by the amount of the bypass current Ibp exiting through the seventh transistor T7 from the driving current Id, is provided to the light emitting element ED, resulting in a clearer representation of the black image. Accordingly, the pixel PXij may implement an accurate black grayscale image using the seventh transistor T7, and as a result, a contrast ratio may be improved.

Next, the light emission control signal EMj supplied from the light emission control line EMLj is changed from a high level to a low level. The fifth transistor T5 and the sixth transistor T6 are turned on by the light emission control signal EMj of a low level. Accordingly, the driving current Id is generated based on a voltage difference between the gate voltage of the gate electrode of the first transistor T1 and the first driving voltage ELVDD. This current is supplied to the light emitting element ED through the sixth transistor T6, allowing the current led to flow through the light emitting element ED.

In the second driving mode, the display panel DP may display an image for a plurality of second driving frames F2. As illustrated in FIG. 5B, each second driving frame F2 may include one write frame WF and 'p' holding frames HF1 to HFp. Here, 'p' may be an integer of 1 or more. As an example of the present disclosure, the write frame WF and each of the 'p' holding frames HF1 to HFp may have a duration corresponding to the first driving frame F1. For example, when the display panel DP operates at a frequency of 1 Hz, the display panel DP displays an image during one second driving frame F2 for 1 second in the second driving mode. In addition, each second driving frame F2 may include one write frame WF and 59 holding frames HF1 to HFp. In this case, 'p' may be 59. When the display panel DP operates at a frequency of 10 Hz, the display panel DP displays an image during one second driving frame F2 for 1/10 second in the second driving mode. In addition, each second driving frame F2 may include one write frame WF and 5 holding frames HF1 to HFp. In this case, 'p' may be 5.

During the write frame WF, the initialization scan signal SIj, the compensation scan signal SCj, and the first and second write scan signals SWj and SWj+1 may each be activated. In 'p' holding frames HF1 to HFp, the first and second write scan signals SWj and SWj+1 are activated, and the initialization scan signal SIj and the compensation scan signal SCj are deactivated. The light emission control signal EMj may be activated in the write frame WF and the 'p' holding frames HF1 to HFp.

In the second driving mode, the initialization scan signal SIj and the compensation scan signal SCj may be output at a frequency lower than a reference frequency, while the light emission control signal EMj and the first and second write scan signals SWj and SWj+1 may be output at the reference frequency.

Like the first driving frame F1, the write frame WF may include the initialization period AP1, the compensation period AP2, and the data write period AP3. During the data write period AP3, the data signal Di is applied to the data line DLi.

Each of the 'p' holding frames HF1 to HFp may not include the initialization period AP1 and the compensation period AP2, but may only include the data write period AP3. During 'p' holding frames HF1 to HFp, the initialization scan signal SIj and the compensation scan signal SCj are maintained in an inactive state. Therefore, during the 'p' number of holding frames HF1 to HFp, the light emitting element ED may maintain the current led flowing into the light emitting element ED during the write frame WF, and each of the 'p' number of holding frames HF1 to HFp may maintain the image displayed during the write frame WF.

Figure 6:
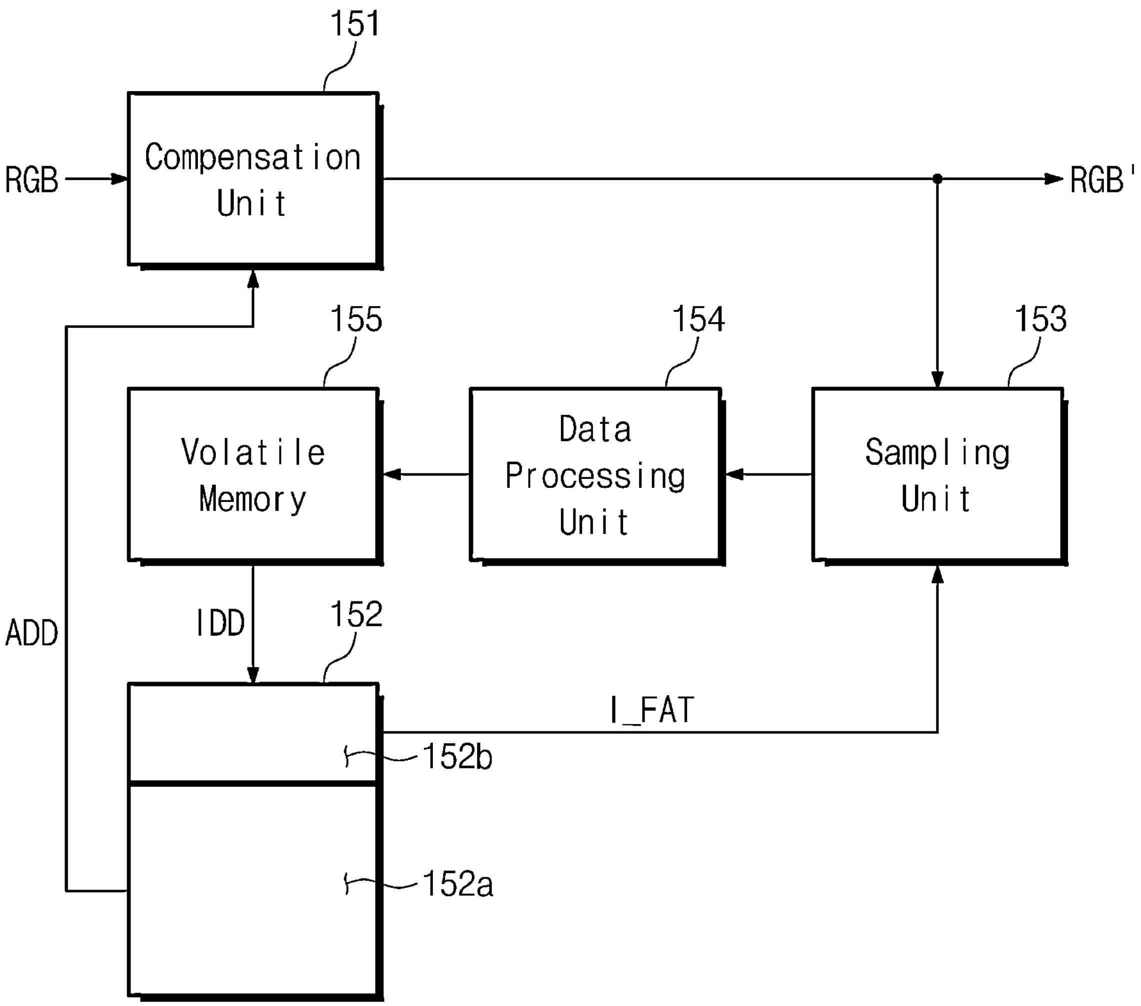
FIG. 6 is a block diagram of an afterimage compensation circuit, according to an embodiment of the present disclosure.
Figure 7A:
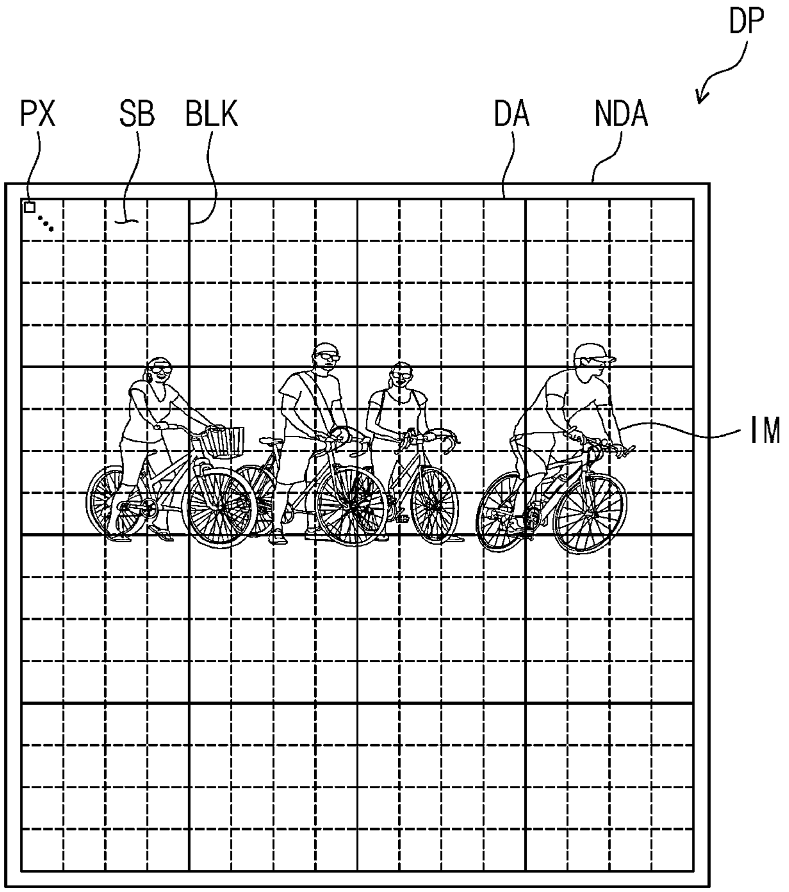
FIG. 7A is a plan view of a display panel, according to an embodiment of the present disclosure.
Figure 7B:
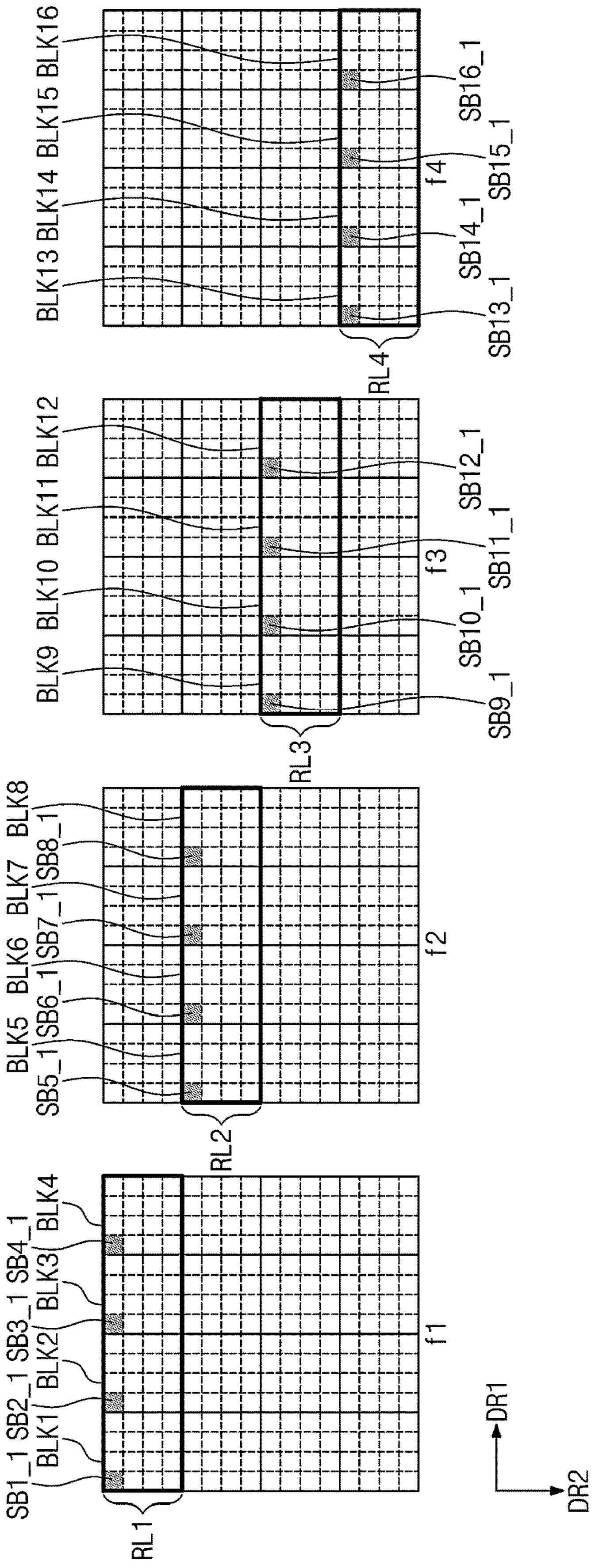
FIGS. 7B to 7D are diagrams illustrating a sampling process of a sampling unit, according to an embodiment of the present disclosure.
Figure 7C:
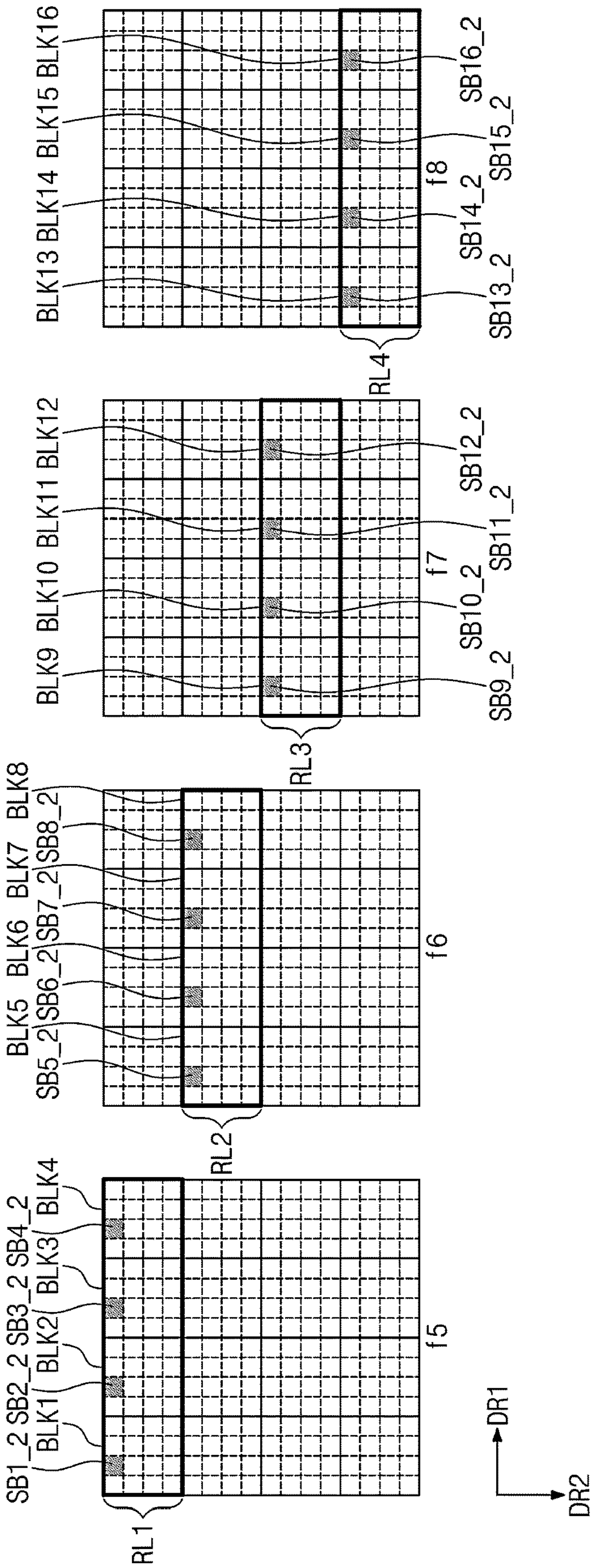
Figure 7D:
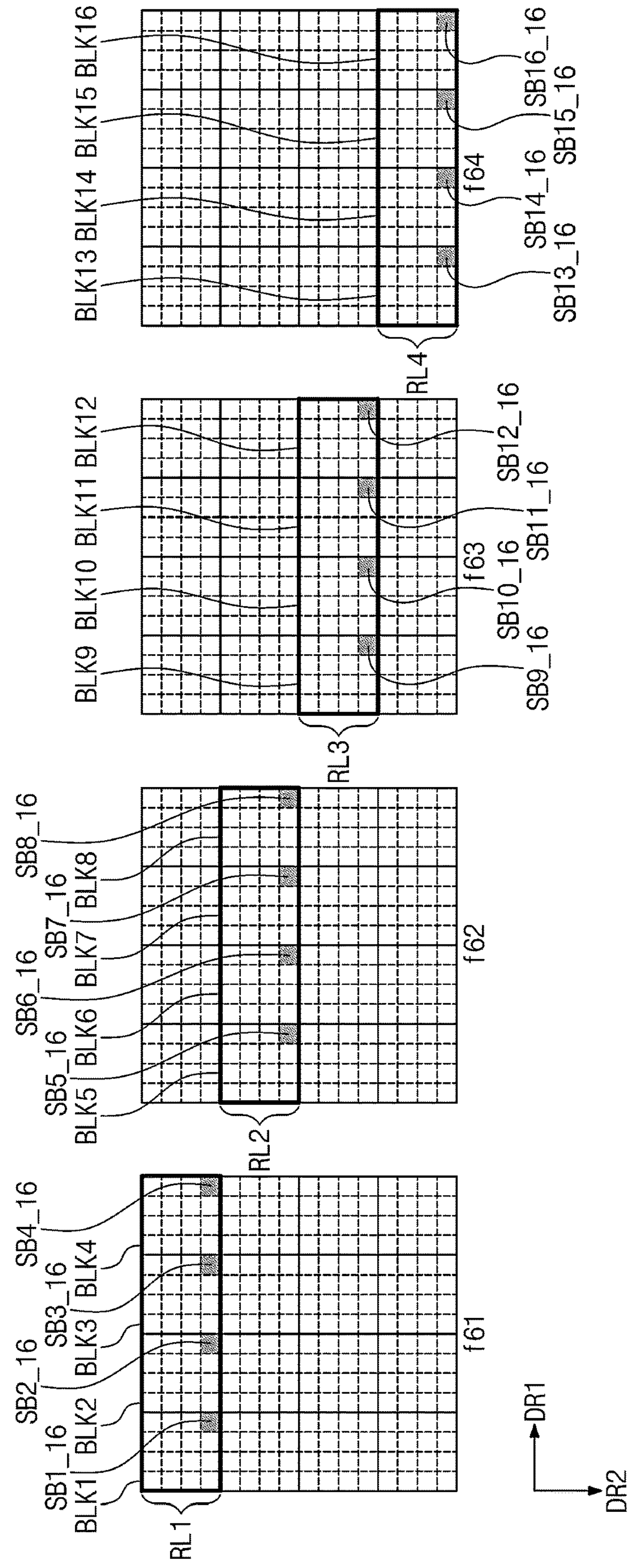

FIG. 6 is a block diagram of an afterimage compensation circuit, according to an embodiment of the present disclosure. FIG. 7A is a plan view of a display panel, according to an embodiment of the present disclosure, and FIGS. 7B to 7D are diagrams illustrating a sampling process of a sampling unit, according to an embodiment of the present disclosure.

Referring to FIG. 6, the afterimage compensation circuit 150 includes a compensation unit 151, a nonvolatile memory 152, a sampling unit 153, a data processing unit 154, and a volatile memory 155.

The compensation unit 151 receives the input image signal RGB and compensates for the input image signal RGB based on accumulated deterioration data ADD stored in the nonvolatile memory 152 to generate the compensation image signal RGB'.

The nonvolatile memory 152 includes a first storage area 152*a* and a second storage area 152*b*. Deterioration data IDD is backed up in the first storage area 152*a* at each of the plurality of backup times that occur at a preset backup period. Accordingly, the nonvolatile memory 152 accumulates the new deterioration data IDD with previously stored accumulated deterioration data in the first storage area 152*a*, resulting in the accumulated deterioration data ADD. The accumulated deterioration data ADD stored in the first storage area 152*a* is provided to the compensation unit 151, which then performs deterioration compensation processing based on this data.

Information I_FAT on backup times is stored in the second storage area 152*b*. The information I_FAT on the backup times stored in the second storage area 152*b* is provided to the sampling unit 153, and the sampling unit 153 determines a sampling position based on the information I_FAT. In particular, to perform a first sampling operation when the power is turned on, the sampling unit 153 may determine the sampling position with reference to the information I_FAT on the last backup time (e.g., a final backup time) just before the power was turned off.

Referring to FIG. 7A, the display panel DP may display an image IM. The display panel DP may include the display area DA on which the image IM is displayed and the non-display area NDA adjacent to the display area DA. The display area DA of the display panel DP may include a plurality of blocks BLK. The display area DA may be divided into the plurality of blocks BLK. In FIG. 7A, the display area DA is illustratively divided into 16 blocks BLK, but the number of blocks BLK is not limited thereto. In FIG. 7A, the plurality of blocks BLK are provided in a 4×4 grid.

As time progresses, afterimages due to deterioration may develop in the display area DA of the display panel DP. The degree of afterimages in the display area DA may vary between the different blocks BLK. The display device DD, according to an embodiment of the present disclosure, compensates for the luminance of the image IM displayed in each block BLK of the display panel DP based on deterioration information specific to each of the blocks BLK.

In an embodiment, a plurality of sub-blocks SB may be disposed in each of the plurality of blocks BLK. The plurality of pixels PX may be disposed in each sub-block SB. The size of each sub-block SB may be determined based on the number of pixels PX included in each sub-block SB. For example, as the number of pixels PX included in each sub-block SB increases, the size of each sub-block SB becomes larger. Conversely, as the number of pixels PX included in each sub-block SB decreases, the size of each sub-block SB becomes smaller. For example, 64 pixels PX may be arranged in each sub-block SB.

FIG. 7A illustrates a structure in which one block BLK includes 16 sub-blocks SB, but the number of sub-blocks SB is not limited to thereto. In this embodiment, compensation for deterioration (hereinafter referred to as deterioration compensation) may be performed in units of the sub-block SB. As the number of sub-block SB included in each block BLK increases, the precision of deterioration compensation may improve.

Referring to FIGS. 6 and 7B to 7D, the sampling unit 153 may receive the compensation image signals RGB' from the compensation unit 151 and may sample some of the compensation image signals RGB'.

As an example of the present disclosure, the sampling unit 153 performs sampling on some of the blocks BLK1 to BLK16 using a reference frame as a unit. As an example of the present disclosure, the reference frame may be one frame. FIGS. 7B to 7D illustrate a case in which the sampling unit 153 performs sampling on four blocks per frame, but the present disclosure is not limited thereto.

The sampling unit 153 may set sampling lines RL1 to RL4 in the display area DA, and may perform a sampling operation by sequentially selecting one of the sampling lines RL1 to RL4 in the first direction DR1 or the second direction DR2. FIGS. 7B to 7D illustrate a structure in which each of the sampling lines RL1 to RL4 extends in the first direction DR1 and is arranged in the second direction DR2, but the present disclosure is not limited thereto. When the display area DA includes 4×4 blocks, each sampling line RL1 to RL4 may include 4 blocks, and it may take a total of 4 frames to sample all blocks BLK1 to BLK16 once. As an example of the present disclosure, each block BLK1 to BLK16 may include 16 sub-blocks of a plurality of sub-blocks SB1_1 to SB16_16. When one sub-block among the 16 sub-blocks is sampled in each frame, 16 frames are required to sample a total of 16 sub-blocks. Therefore, a total of 64 frames may be required to sample all sub-blocks SB1_1 to SB16_16 included in all blocks BLK1 to BLK16 once. The 64 frames required to sample all sub-blocks SB1_1 to SB16_16 included in all blocks BLK1 to BLK16 once may be referred to as one sampling period. The sampling unit 153 may perform a sampling operation by repeating the sampling period.

As illustrated in FIG. 7B, sampling of the blocks (e.g., first to fourth blocks BLK1 to BLK4) located on the first sampling line RL1 in a first frame f1 (or a first reference frame) is carried out. The compensation image signals for the first sub-blocks SB1_1, SB2_1, SB3_1, and SB4_1 located in each of the first to fourth blocks BLK1 to BLK4 in the first frame f1 may be sampled as a first line image signal. The compensation image signals for the first sub-blocks SB5_1, SB6_1, SB7_1, and SB8_1 located in each of the blocks (e.g., fifth to eighth blocks BLK5 to BLK8) located in the second sampling line RL2 in a second frame f2 may be sampled as a second line image signal. In a third frame f3, sampling is performed on blocks located on the third sampling line RL3 (e.g., 9th to 12th blocks BLK9 to BLK12). The compensation image signals for the first sub-blocks SB9_1, SB10_1, SB11_1, and SB12_1 located in each of the 9th to 12th blocks BLK9 to BLK12 in the third frame f3 may be sampled as a third line image signal. The compensation image signals for the first sub-blocks SB13_1, SB14_1, SB15_1, and SB16_1 located in each of blocks (e.g., 13th to 16th blocks BLK13 to BLK16) located on the fourth sampling line RL4 in a fourth frame f4 may be sampled as a fourth line image signal.

As illustrated in FIG. 7C, the compensation image signals for the second sub-blocks SB1_2, SB2_2, SB3_2, and SB4_2 located in each of the first to fourth blocks BLK1 to BLK4 of the first sampling line RL1 in a fifth frame f5 may be sampled as a fifth line image signal. The compensation image signals for the second sub-blocks SB5_2, SB6_2, SB7_2, and SB8_2 located in each of the fifth to eighth blocks BLK5 to BLK8 of the second sampling line RL2 in a sixth frame f6 may be sampled as a sixth line image signal. The compensation image signals for the second sub-blocks SB9_2, SB10_2, SB11_2, and SB12_2 located in each of the 9th to 12th blocks BLK9 to BLK12 of the third sampling line RL3 in a seventh frame f7 may be sampled as a seventh line image signal. The compensation image signals for the second sub-blocks SB13_2, SB14_2, SB15_2, and SB16_2 located in each of the 13th to 16th blocks BLK13 to BLK16 of the fourth sampling line RL4 in an eighth frame f8 may be sampled as an eighth line image signal.

As illustrated in FIG. 7D, the compensation image signals for 16th sub-blocks SB1_16, SB2_16, SB3_16, and SB4_16 located in each of the first to fourth blocks BLK1 to BLK4 of the first sampling line RL1 in a 61st frame f61 may be sampled as a 61st line image signal. The compensation image signals for the 16th sub-blocks SB5_16, SB6_16, SB7_16, and SB8_16 located in each of the fifth to eighth blocks BLK5 to BLK8 of the second sampling line RL2 in a 62nd frame f62 may be sampled as a 62nd line image signal. The compensation image signals for the 16th sub-blocks SB9_16, SB10_16, SB11_16, and SB12_16 located in each of the 9th to 12th blocks BLK9 to BLK12 of the third sampling line RL3 in a 63rd frame f63 may be sampled as a 63rd line image signal. The compensation image signals for the 16th sub-blocks SB13_16, SB14_16, SB15_16, and SB16_16 located in each of the 13th to 16th blocks BLK13 to BLK16 of the fourth sampling line RL4 in a 64th frame f64 may be sampled as a 64th line image signal.

The sampling unit 153 may sequentially provide the sampled first to 64th line image signals to the data processing unit 154. The data processing unit 154 may generate deterioration data for each of the first to 64th line image signals and may store the generated deterioration data in the volatile memory 155. The deterioration data stored in the volatile memory 155 may be backed up (or accumulated) in the nonvolatile memory 152 at a plurality of backup times that occur according to a preset backup period.

As an example of the present disclosure, the preset backup period may have a duration that sequentially increases from the power-on time to a predetermined time, after which it remains fixed. For example, after power-on, a first backup period may be set to 2 minutes, a second backup period may be set to 5 minutes, and from a third backup period onwards, it may be fixed to 10 minutes.

Figure 8:
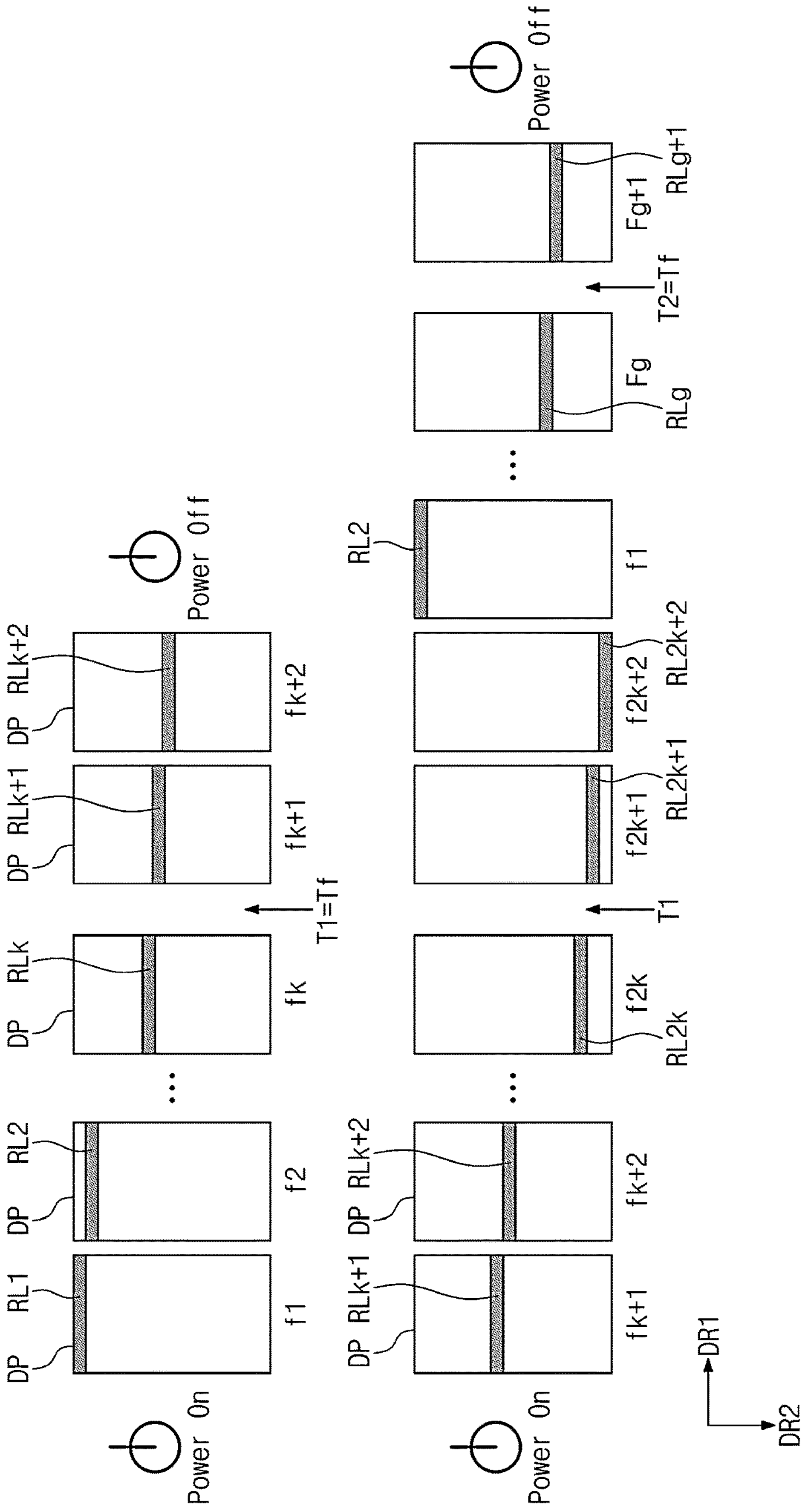
FIGS. 8 and 9 are diagrams for describing a sampling operation, according to an embodiment of the present disclosure.
Figure 9:
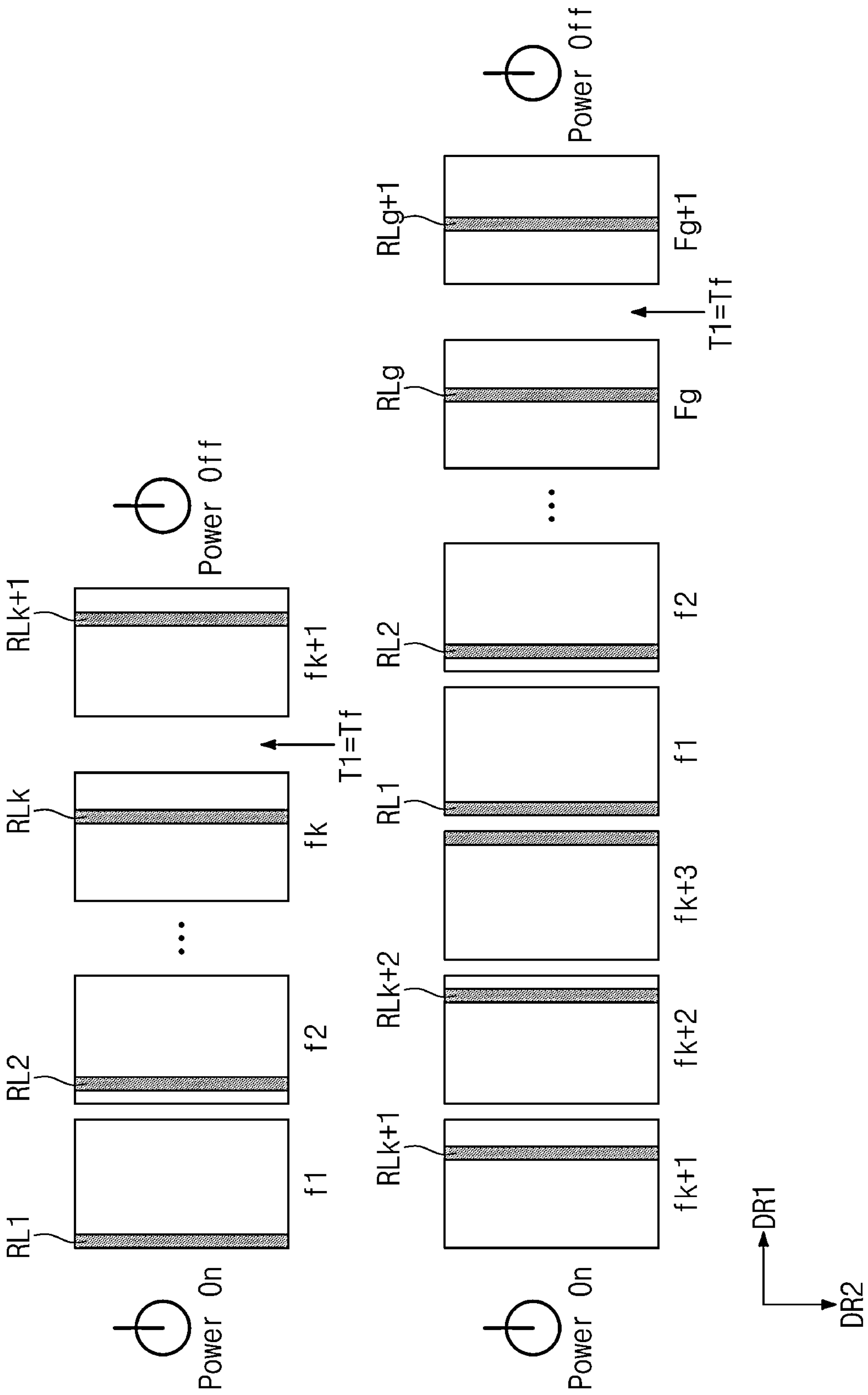

FIG. 8 is a diagram for describing a case in which a sampling operation proceeds in a second direction, according to an embodiment of the present disclosure. FIG. 9 is a diagram for describing a case in which a sampling operation proceeds in a first direction, according to an embodiment of the present disclosure.

Referring to FIGS. 6 and 8, when the power is turned on for the first sampling operation, the sampling unit 153 may load information about the final backup time Tf from the nonvolatile memory 152. The final backup time Tf refers to the last backup time recorded just before the power was turned off. As an example of the present disclosure, information about the final backup time Tf may include one or more of the following: the number of a final reference frame of the final backup time Tf; the number of a final sampling line of the final backup time Tf; and the number of blocks included in the final sampling line.

When there is no recorded history of the final backup time Tf stored in the nonvolatile memory 152, or if the second storage area 152b of the nonvolatile memory 152 has been reset, the sampling unit 153 may initiate a sampling operation starting from the first sampling line RL1 in the first frame f1 after the power is turned on. Thereafter, in the second frame f2, the sampling unit 153 may perform a sampling operation on the second sampling line RL2, and in a k-th frame fk, the sampling unit 153 may perform a sampling operation on a k-th sampling line RLk.

The first frame f1 to the k-th frame fk may correspond to the first backup period. Accordingly, when the sampling operation for the k-th sampling line RLk is terminated, the volatile memory 155 may accumulate the deterioration data IDD in the first storage area 152a of the nonvolatile memory 152 at the first backup time T1. In addition, at the first backup time T1, the second storage area 152b of the nonvolatile memory 152 may store information about the first backup time T1, for example, at least one of the number of the k-th frame fk, the number of the k-th sampling line RLk sampled at the k-th frame fk, or the number of blocks included in the k-th sampling line RLk.

Even if the duration of the first backup period is shorter than one sampling period, the sampling unit 153 determines the sampling position based on the information about the first backup time T1. Consequently, the sampling unit 153 may continue sampling for a (k+1)-th sampling line RLk+1 in a (k+1)-th frame fk+1 after the first backup time T1.

Thereafter, the power may be turned off immediately after the sampling operation for a (k+2)-th sampling line RLk+2 is performed in a (k+2)-th frame fk+2. In this case, the final backup time Tf may coincide with the first backup time T1, and the number of the k-th frame fk may be considered the number of the final reference frame.

When the power is turned on again, the sampling unit 153 may load information about the final backup time Tf stored in the second storage area 152b of the nonvolatile memory 152. For example, if the number of the k-th frame fk is stored as part of the information about the final backup time Tf, the sampling unit 153 may initiate a sampling operation from the (k+1)-th sampling line RLk+1, which corresponds to the next frame (e.g., the (k+1)-th frame fk+1) of the k-th frame fk. In this scenario, the (k+1)-th frame fk+1 becomes the start frame, and the (k+1)-th sampling line RLk+1 serves as the reference sampling line. Therefore, the sampling unit 153 begins the sampling operation from the sampling line (e.g., the (k+1)-th sampling line RLk+1) that immediately follows the k-th sampling line RLk sampled at the final backup time Tf.

Thereafter, in the (k+2)-th frame fk+2, the sampling unit 153 performs a sampling operation on the (k+2)-th sampling line RLk+2. When sampling for a 2k-th sampling line RL2*k* is completed, the volatile memory 155 may accumulate the deterioration data IDD in the first storage area 152*a* of the nonvolatile memory 152 at the first backup time T1. In addition, at the first backup time T1, the second storage area 152*b* of the nonvolatile memory 152 may store information about the first backup time T1 (e.g., at least one of the number of the 2k-th frame f2*k*, the number of the 2k-th sampling line RL2*k* sampled in the 2k-th frame f2*k*, or the number of blocks included in the 2k-th sampling line RL2*k*).

Even if the duration of the first backup period is shorter than one sampling period, the sampling unit 153 determines the sampling position based on the information about the first backup time T1. As a result, the sampling unit 153 may continue the sampling operation for the (2k+1)-th sampling line RL2*k*+1 in the (2k+1)-th frame f2*k*+1 following the first backup time T1.

Afterwards, the sampling unit 153 may perform a sampling operation for the (2k+1)-th sampling line RL2*k*+1 in the (2k+2)-th frame f2*k*+2, completing one sampling period even if the power is turned off midway. Once one sampling period is completed, the sampling unit 153 may being sampling again from the first sampling line RL1, starting with the first frame f1. The first frame f1 to a g-th frame fg may correspond to a second backup period. Accordingly, upon completing the sampling for a g-th sampling line RLg, the volatile memory 155 may accumulate the deterioration data IDD in the first storage area 152*a* of the nonvolatile memory 152 at the second backup time T2.

In addition, at the second backup time T2, the second storage area 152*b* of the nonvolatile memory 152 may store information about the second backup time T2 (e.g., at least one of the number of the g-th frame fg, the number of the g-th sampling line RLg sampled at the g-th frame fg, or the number of blocks included in the g-th sampling line RLg). Thereafter, the power may be turned off immediately after completing the sampling operation for the (g+1)-th sampling line RLg+1 in the (g+1)-th frame fg+1. In this case, the final backup time Tf is recorded as the second backup time T2.

When the power is turned on again, the sampling unit 153 may load information about the final backup time Tf stored in the second storage area 152*b* of the nonvolatile memory 152. For example, when the number of the g-th frame fg is stored as information about the final backup time Tf, the sampling unit 153 may start the sampling operation from the (g+1)-th sampling line RLg+1 by adding '1' to the g-th sampling line RLg corresponding to the g-th frame fg. In other words, if the number of the g-th frame fg is stored as part of the information about the final backup time Tf, the sampling unit 153 may begin the sampling operation from the (g+1)-th sampling line RLg+1 by incrementing the g-th sampling line RLg, which corresponds to the g-th frame fg, by one.

In this way, when information about backup times is stored in the second storage area 152*b* of the nonvolatile memory 152, information about the final backup time Tf remains in the nonvolatile memory 152 even when the power is turned off. Accordingly, when the power is turned on again, the sampling unit 153 determines the sampling position based on information about the final backup time Tf. This allows the sampling unit 153 to continue sampling the sampling lines that were not sampled due to the power being turned off, resulting in a more efficient sampling operation.

Additionally, in the second driving mode, which operates at a low frequency, there may be instances where the duration of one backup period is shorter than one sampling period. In such cases, storing information about backup times in the second storage area 152*b* of the nonvolatile memory 152 helps prevent the accumulation of deterioration data in only a specific area. As a result, even in the second driving mode, the afterimage compensation circuit 150 can store deterioration data uniformly across the entire display area DA. This uniform data storage enables the afterimage compensation circuit 150 to perform accurate deterioration compensation, thereby improving display quality by reducing afterimage effects.

In FIG. 8, the sampling lines RL1 to RLk+2, RL2*k* to RL2*k*+2, RLg, and RLg+1 may extend in the first direction DR1. However, the present disclosure is not limited to thereto.

As illustrated in FIGS. 6 and 9, the sampling lines RL1 to RLk+2, RLg, and RLg+1 may extend in the second direction DR2.

The first frame f1 to the k-th frame fk may correspond to the first backup period. Accordingly, when the sampling operation for the k-th sampling line RLk is terminated, the volatile memory 155 may accumulate the deterioration data IDD in the first storage area 152*a* of the nonvolatile memory 152 at the first backup time T1. In addition, at the first backup time T1, the second storage area 152*b* of the nonvolatile memory 152 may store information about the first backup time T1, for example, at least one of the number of the k-th frame fk, the number of the k-th sampling line RLk sampled at the k-th frame fk, or the number of blocks included in the k-th sampling line RLk. Thereafter, the power may be turned off immediately after the sampling operation for the (k+1)-th sampling line RLk+1 is performed in the (k+1)-th frame fk+1. In this case, the final backup time Tf may be the first backup time T1.

When the power is turned on again, the sampling unit 153 may load information about the final backup time Tf stored in the second storage area 152*b* of the nonvolatile memory 152. For example, when the number of the k-th frame fk is stored as information about the final backup time Tf, the sampling unit 153 may start the sampling operation from the (k+1)-th sampling line RLk+1 by adding '1' to the k-th sampling line RLk corresponding to the k-th frame fk.

In detail, in the (k+1)-th frame fk+1, the sampling unit 153 may perform the sampling operation on the sampling line (e.g., the (k+1)-th sampling line RLk+1) immediately following the k-th sampling line RLk, which was sampled at the final backup time Tf. The sampling unit 153 may continue the sampling operation up to the final sampling line RLk+3 from the (k+3)-th frame fk+3, and may complete one sampling period even if the power is turned off midway. When one sampling period is completed, the sampling unit 153 may restart sampling from the first sampling line RL1 in the first frame f1. The (k+1)-th frame fk+1 to the g-th frame fg may correspond to the first backup period. Accordingly, when sampling for the g-th sampling line RLg is completed, the volatile memory 155 may accumulate the deterioration data IDD in the first storage area 152*a* of the nonvolatile memory 152 at the first backup time T1.

Thereafter, the power may be turned off immediately after the sampling operation for the (g+1)-th sampling line RLg+1 is performed in the (g+1)-th frame fg+1. In this case, the final backup time Tf may be the first backup time T1.

When the power is turned on again, the sampling unit 153 may load information about the final backup time Tf stored in the second storage area 152*b* of the nonvolatile memory

152. For example, when the number of the g-th frame fg is stored as information about the final backup time Tf, the sampling unit 153 may start the sampling operation from the (g+1)-th sampling line RLg+1 by adding '1' to the g-th sampling line RLg corresponding to the g-th frame fg.

In this way, when the duration of one backup period in the second driving mode is shorter than one sampling period, storing information about backup times in the second storage area 152*b* of the nonvolatile memory 152 helps prevent the accumulation of deterioration data in only specific areas. Therefore, even in the second driving mode, the afterimage compensation circuit 150 may store the deterioration data a uniform number of times over the entire display area DA. As a result, accurate deterioration compensation may be performed, improving the display quality by reducing the occurrence of afterimages.

Figure 10:
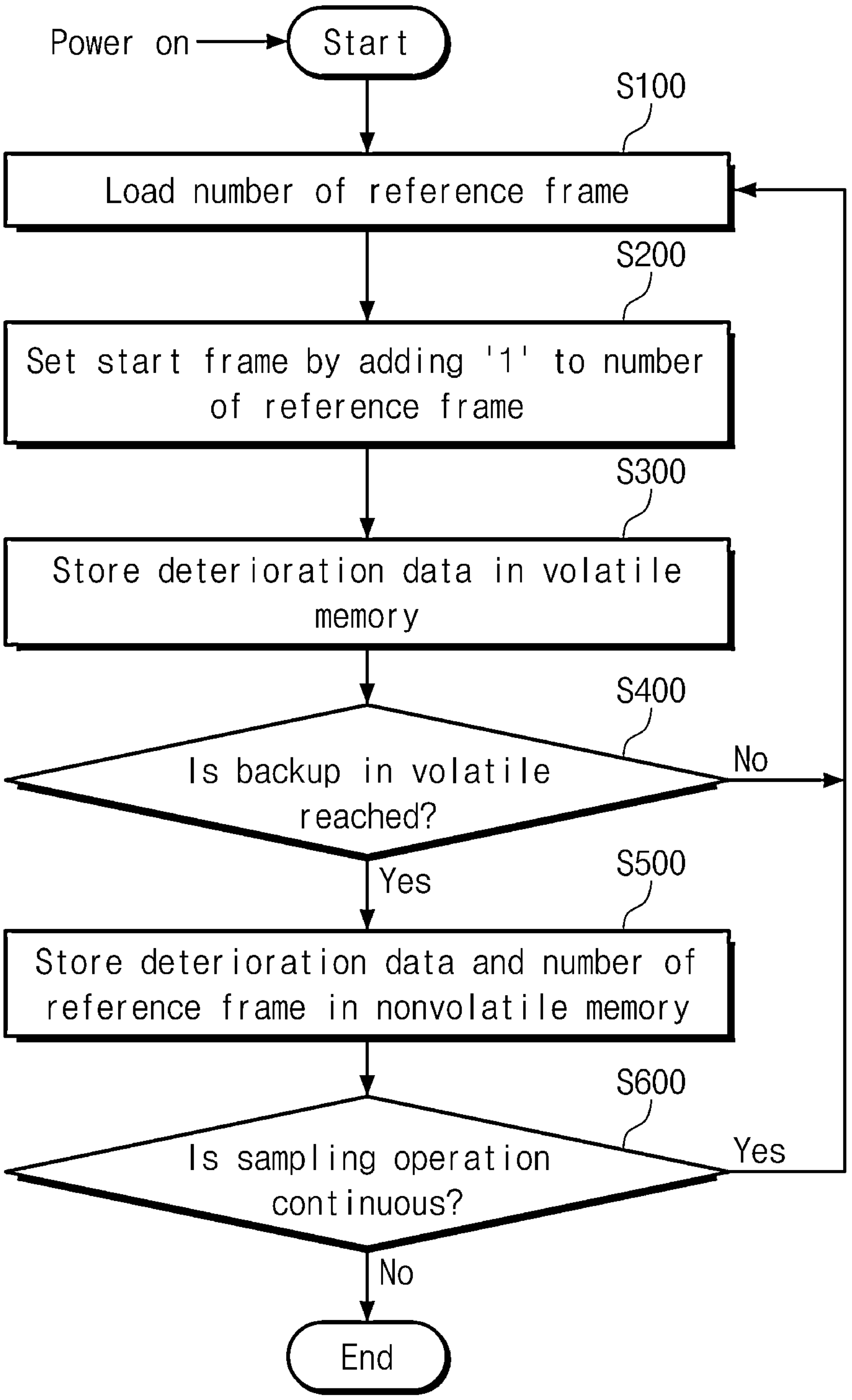
FIG. 10 is a flowchart illustrating an operation process of an afterimage compensation circuit, according to an embodiment of the present disclosure.

FIG. 10 is a flowchart illustrating an operation process of an afterimage compensation circuit, according to an embodiment of the present disclosure.

Referring to FIGS. 6 and 10, the afterimage compensation circuit 150 may start an operation when the power is turned on (e.g., the power-on time).

First, the sampling unit 153 may load information about the final backup time stored in the second storage area 152*b* of the nonvolatile memory 152. When the number of the reference frame is stored in the second storage area 152*b*, the sampling unit 153 may load the number of the final reference frame (or the reference frame) for the final backup time (S100).

The sampling unit 153 may set a start frame by adding '1' to the loaded reference frame number and may perform a sampling operation starting from the reference sampling line corresponding to the start frame (S200). In other words, the line image signals for the sampling lines may be sampled through a sampling operation, and the data processing unit 154 may generate deterioration data for the sampling lines based on the line image signals.

Afterwards, the deterioration data may be stored in the volatile memory 155 (S300). The deterioration data stored in the volatile memory 155 may be accumulated in the nonvolatile memory at each preset backup period. The afterimage compensation circuit 150 determines whether the backup time is reached (S400). If the backup time is not reached, the afterimage compensation circuit 150 moves to operation S100 and repeats the sampling operation. If the backup time is reached, the afterimage compensation circuit 150 may store the deterioration data and the reference frame number in the nonvolatile memory 152 (S500).

When the storing operation is completed, it is determined whether to continue the sampling operation (S600). It is determined that the sampling operation should continue, the process returns to operation S100 and the sampling operation is repeated. Otherwise, the sampling operation may end.

Figure 11A:
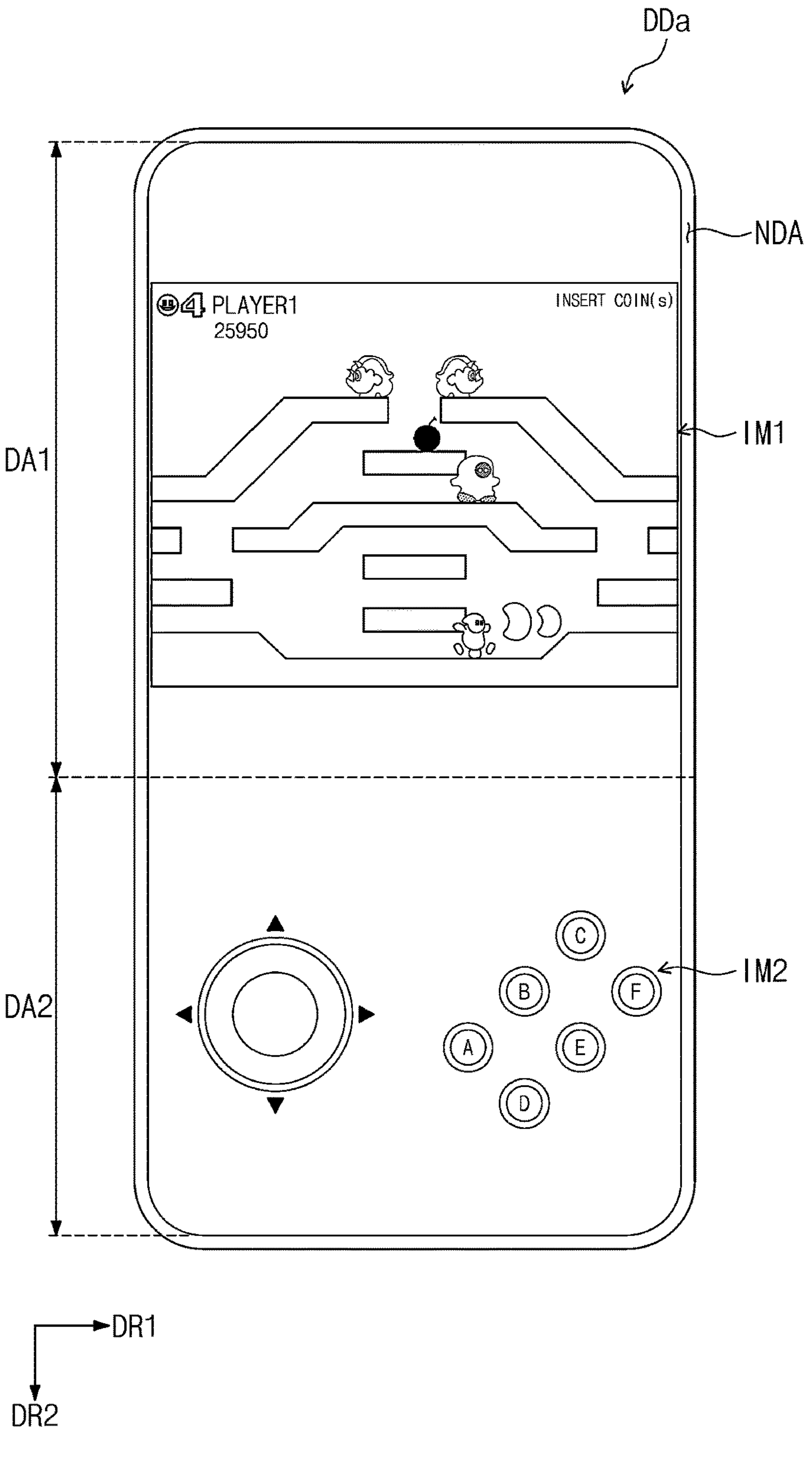
FIG. 11A is a plan view illustrating a screen of a display device, according to an embodiment of the present disclosure.
Figure 11B:
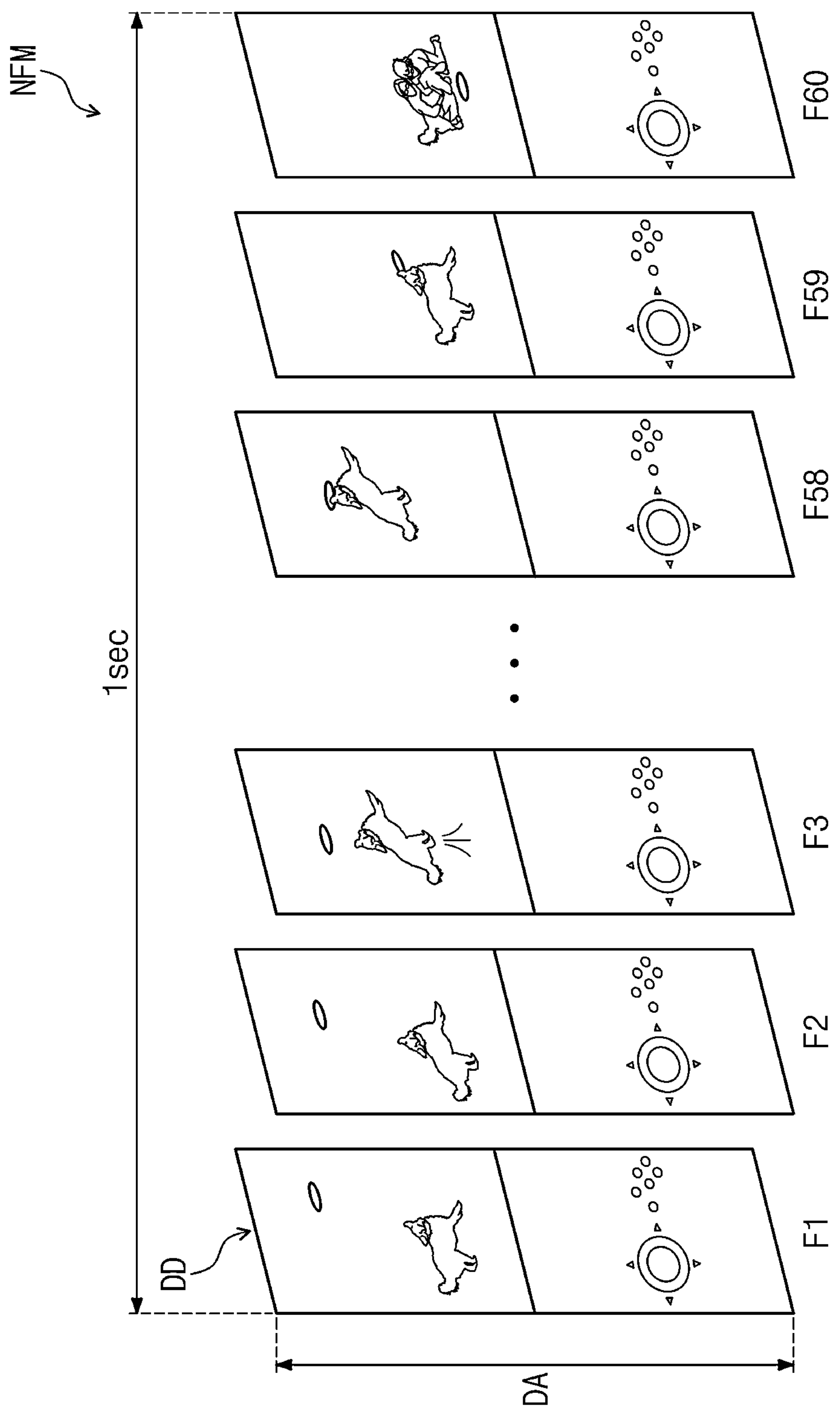
FIG. 11B is a diagram for describing an operation of a display device in a normal frequency mode, according to an embodiment of the present disclosure.

FIG. 11A is a plan view illustrating a screen of a display device, according to an embodiment of the present disclosure. FIG. 11B is a diagram for describing an operation of a display device in a normal frequency mode, according to an embodiment of the present disclosure, and FIG. 11C is a diagram for describing an operation of a display device in a multi-frequency mode, according to an embodiment of the present disclosure.

Figure 11C:
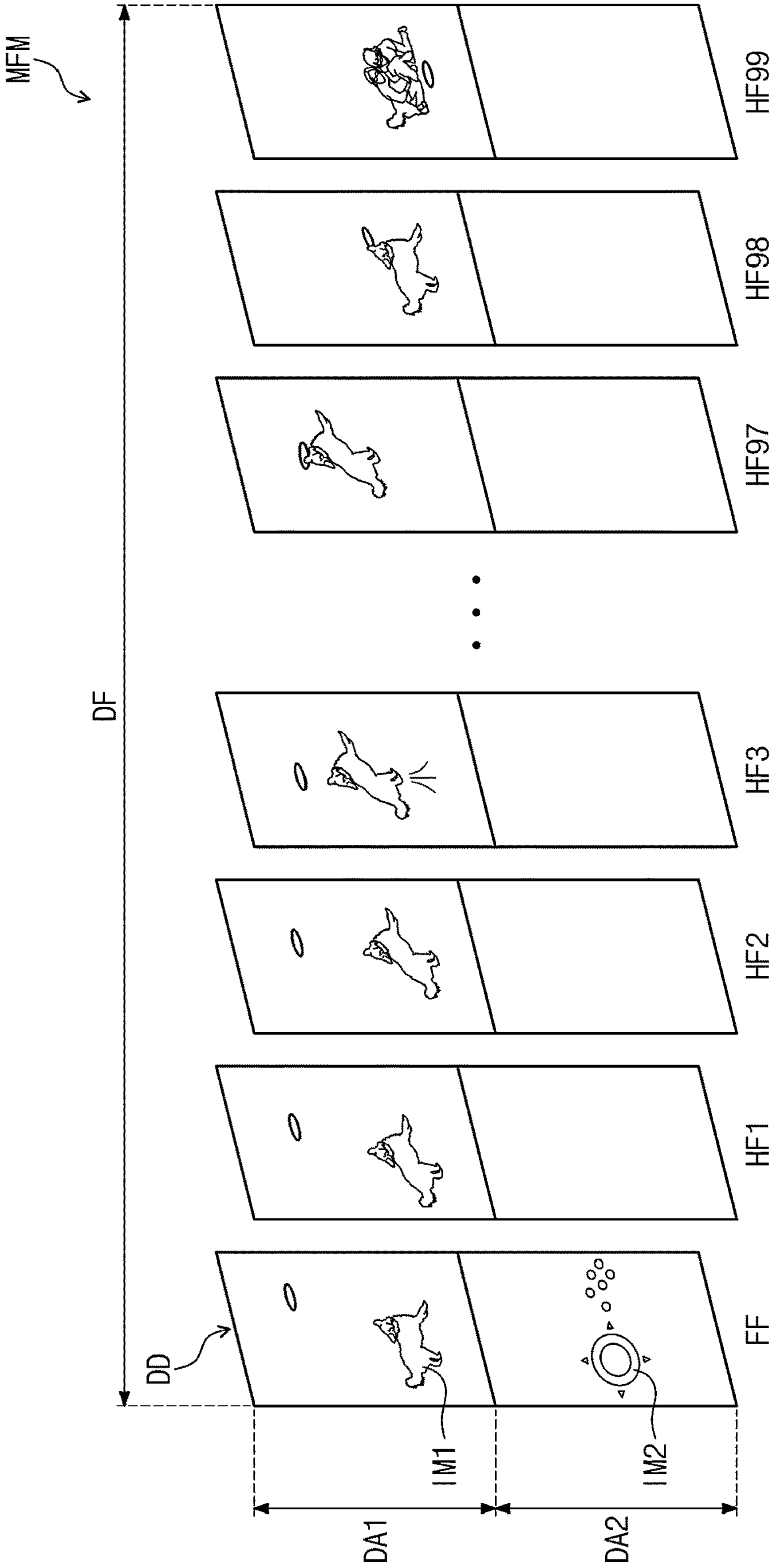
FIG. 11C is a diagram for describing an operation of a display device in a multi-frequency mode, according to an embodiment of the present disclosure.

Referring to FIGS. 11A to 11C, a display device DDa may display images in a normal frequency mode NFM or a multi-frequency mode MFM. In the normal frequency mode NFM, the display area DA of the display device DDa is not divided into a plurality of display areas with different driving frequencies. For example, in the normal frequency mode NFM, the display area DA operates at one driving frequency, and in the normal frequency mode NFM, the driving frequency of the display area DA may be referred to as a normal frequency. For example, the normal frequency may be 60 Hz or 120 Hz. In the normal frequency mode NFM, 60 images corresponding to a first frame F1 to a 60th frame F60 may be displayed in the display area DA of the display device DDa for 1 second (1 sec).

In the multi-frequency mode MFM, the display area DA of the display device DDa is divided into a plurality of display areas with different driving frequencies. As an example of the present disclosure, in the multi-frequency mode MFM, the display area DA may include a first display area DA1 and a second display area DA2. The first and second display areas DA1 and DA2 are disposed adjacent to each other in the second direction DR2. The driving frequency (or a first frequency) of the first display area DA1 may be a frequency higher than or equal to the normal frequency, and the driving frequency (or a second frequency) of the second display area DA2 may be a frequency less than the normal frequency. For example, when the normal frequency is 60 Hz, the driving frequency of the first display area DA1 may be 90 Hz, 100 Hz, 120 Hz, 240 Hz, or 480 Hz, and the driving frequency of the second display area DA2 may be 1 Hz, 20 Hz, 30 Hz, 40 Hz, etc.

As an example of the present disclosure, the first display area DA1 may be an area where a moving image (hereinafter referred to as a first image IM1) that requires high-speed driving is displayed. The second display area DA2 may be an area where a still image (hereinafter referred to as a second image IM2) that does not require high-speed driving or a text image with a long change period is displayed. Therefore, when the still image and the moving image are displayed simultaneously on a screen of the display device DDa, the display quality of the moving image may be improved, and overall power consumption may be reduced by operating the display device DDa in the multi-frequency mode MFM.

In the multi-frequency mode MFM, an image may be displayed in the display area DA of the display device DDa for a plurality of driving frames. Each of the driving frames includes a full frame FF in which the first display area DA1 and the second display area DA2 are driven, and partial frames HF1 to HF99 in which only the first display area DA1 is driven. Each of the partial frames HF1 to HF99 may have a shorter duration than the full frame FF. The number of partial frames HF1 to HF99 included in each driving frame may be the same or different. Each driving frame may be a period from when the current full frame FF starts to when the next full frame FF starts.

As an example of the present disclosure, the first display area DA1 may operate at 100 Hz and the second display area DA2 may operate at 1 Hz during each driving frame DF. In this case, the each driving frame DF has a duration corresponding to 1 second (1 sec) and may include one full frame FF and 99 partial frames HF1 to HF99. During the each driving frame DF, 100 first images IM1 corresponding to the one full frame FF and the 99 partial frames HF1 to HF99 may be displayed in the first display area DA1 of the display device DDa, and one second image IM2 corresponding to the one full frame FF may be displayed in the second display area DA2.

In FIG. 11C, for convenience of description, in the multi-frequency mode MFM, although the driving frequency of the first display area DA1 is 100 Hz and the driving frequency of the second display area DA2 is 1 Hz are illustrated as an example, the present disclosure is not limited to thereto. For example, the driving frequency of the first display area DA1 may be 100 Hz, and the driving frequency of the second display area DA2 may be 20 Hz. In this case, during the each driving frame DF, five first images IM1 corresponding to the one full frame FF and four partial frames are displayed in the first display area DA1 of the display device DD, and the one second image IM2 corresponding to the one full frame FF may be displayed in the second display area DA2. In addition, the driving frequency of the first display area DA1 may be 90 Hz, and the driving frequency of the second display area DA2 may be 30 Hz. In this case, during the each driving frame DF, three first images IM1 corresponding to the one full frame FF and two partial frames are displayed in the first display area DA1 of the display device DD, and the one second image IM2 corresponding to the one full frame FF may be displayed in the second display area DA2.

In this scenario, in the multi-frequency mode MFM where a high-frequency area (e.g., the first display area DA1) and a low-frequency area (e.g., the second display area DA2) exist within a single display area DA, the full frame FF is used as the reference frame. However, partial frames may not be considered as the reference frame during the sampling operation. In other words, the sampling unit 153 (refer to FIG. 6) may perform the sampling operation in units of one full frame FF. Accordingly, the sampling operation may be performed based on the characteristics of the low frequency area.

Even when operating in multi-frequency mode MFM, there may be instances where the duration of one backup period is shorter than one sampling period. In such cases, storing information about backup times in the second storage area 152*b* of the nonvolatile memory 152 can address the issue of accumulating deterioration data only for a specific area. As a result, even in the multi-frequency mode MFM, the afterimage compensation circuit 150 may store the deterioration data uniformly across the entire display area DA. Accordingly, the afterimage compensation circuit 150 may perform accurate deterioration compensation, thereby improving display quality by reducing afterimage-related deterioration.

Figure 12:
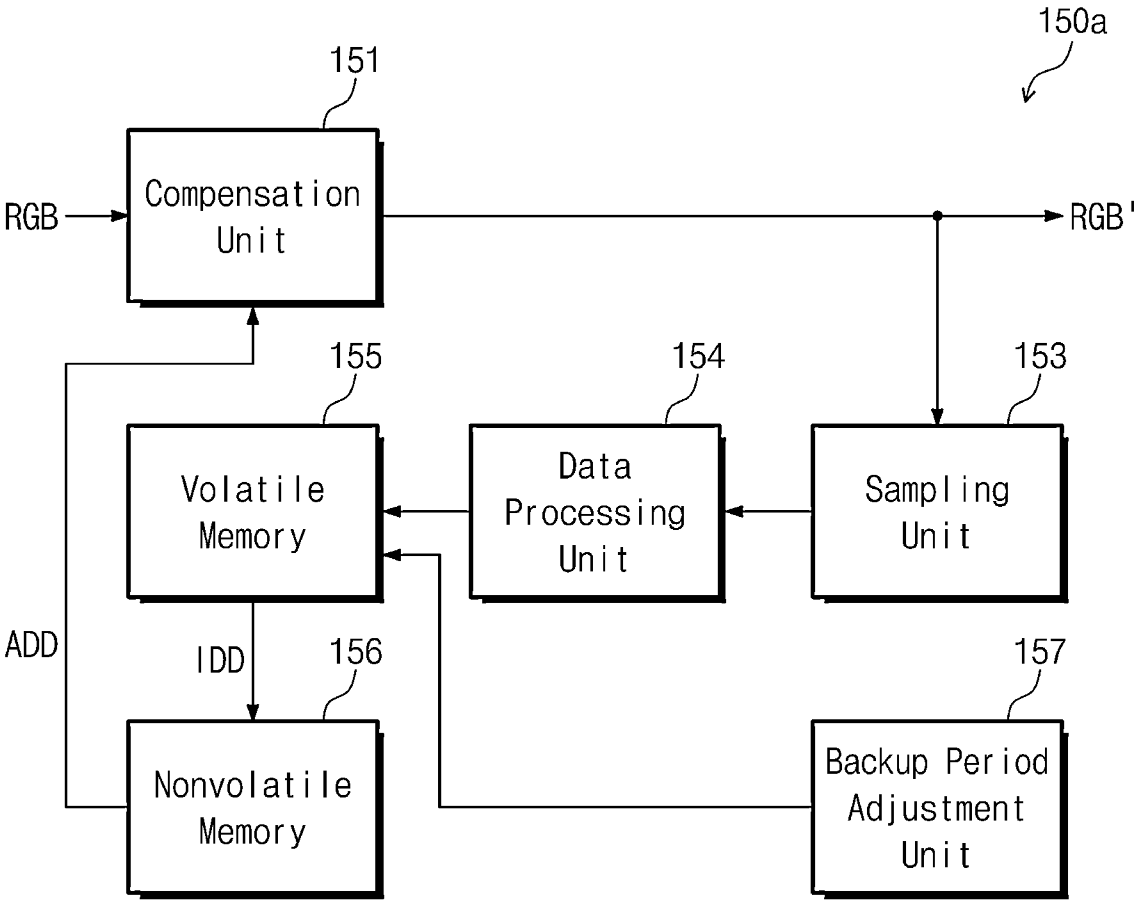
FIG. 12 is a block diagram of an afterimage compensation circuit, according to an embodiment of the present disclosure.
Figure 13:
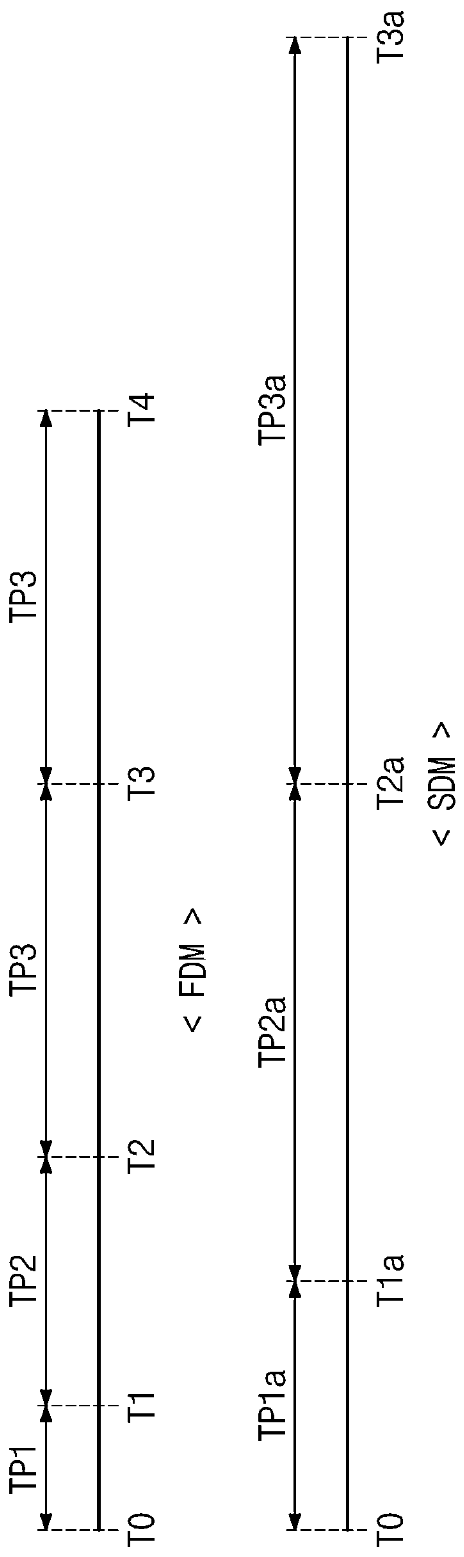
FIG. 13 is a diagram illustrating differently set backup periods in the first and second driving modes, according to an embodiment of the present disclosure.

FIG. 12 is a block diagram of an afterimage compensation circuit, according to an embodiment of the present disclosure, and FIG. 13 is a diagram illustrating differently set backup periods in the first and second driving modes, according to an embodiment of the present disclosure. In FIG. 12, the same reference numerals are used for components identical to those in FIG. 6, and additional descriptions of these components will be omitted to avoid redundancy.

FIGS. 12 and 13, an afterimage compensation circuit 150*a* according to an embodiment of the present disclosure includes the compensation unit 151, a nonvolatile memory 156, the sampling unit 153, the data processing unit 154, the volatile memory 155, and a backup period adjustment unit 157.

The deterioration data is accumulated in the nonvolatile memory 152 at each of a plurality of backup times that occur at a preset backup period. The sampling unit 153 may sequentially provide sampled line image signals to the data processing unit 154. The data processing unit 154 may generate the deterioration data for each line image signal and may store the generated deterioration data in the volatile memory 155. The deterioration data stored in the volatile memory 155 may be accumulated in the nonvolatile memory 152 at each of the plurality of backup times that occur at a preset backup period.

The backup period adjustment unit 157 may vary the backup period depending on the driving mode of the display device DD. For example, the display device DD may operate in a first driving mode FDM or a second driving mode SDM. The first driving mode FDM may be a driving mode in which the display panel DP operates above the reference frequency, and the second driving mode SDM may be a driving mode in which the display panel DP operates below the reference frequency.

In the first driving mode FDM, where the display device DD operates at the reference frequency or higher, the deterioration data IDD may be backed up to the nonvolatile memory 156 at a preset reference backup period. As illustrated in FIG. 13, in the first driving mode FDM, the reference backup period is sequentially increased from the power-on time T0 to a predetermined time (e.g., a third backup time T3), and the reference backup period may have a fixed value after the predetermined time. A 1-1 backup period TP1 corresponds to the period from the power-on time T0 to a 1-1 backup time T1, and a 1-2 backup period TP2 corresponds to the period from the 1-1 backup time T1 to a 2-1 backup time T2. A 1-3 backup period TP3 corresponds to a period from the 2-1 backup time T2 to a 3-1 backup time T3 and a period from the 3-1 backup time T3 to a 4-1 backup time T4. For example, the 1-1 backup period TP1 may be set to 2 minutes, the 1-2 backup period TP2 may be set to 5 minutes, and periods beyond the 1-3 backup period TP3 may be set to 10 minutes.

In the second driving mode SDM in which the display device DD operates below the reference frequency, the backup period adjustment unit 157 may generate a variable backup period that is different from the preset reference backup period. Accordingly, in the second driving mode SDM, the deterioration data may be backed up in the nonvolatile memory 156 at the variable backup period. In the second driving mode SDM, the variable backup period may vary based on the driving frequency.

As illustrated in FIG. 13, in the second driving mode SDM, the variable backup period is sequentially increased from the power-on time T0 to a predetermined time (e.g., a third backup time T3*a*), and the variable backup period may have a fixed value after the predetermined time. A 2-1 backup period TP1*a* corresponds to a period from the power-on time T0 to a 1-2 backup time T1*a*, and a 2-2 backup period TP2*a* corresponds to a period from the 1-2 backup time T1*a* to a 2-2 backup time T2*a*. A 2-3 backup period TP3*a* corresponds to a period from the 2-2 backup time T2*a* to a 3-2 backup time T3*a*. As an example of the present disclosure, the 2-1 backup period TP1*a* may be greater than the 1-1 backup period TP1, the 2-2 backup period TP2*a* may be greater than the 1-2 backup period TP2, and the 2-3 backup period TP3*a* may be greater than the 1-3 backup period TP3. For example, the 1-1 backup period TP1*a* may be set to 2 minutes, the 1-2 backup period TP2*a* may be set to 10 minutes, and periods beyond the 1-3 backup period TP3*a* may be set to 20 minutes.

The duration of each of the 2-1 backup period TP1*a*, the 2-2 backup period TP2*a*, and the 2-3 backup period TP3*a* may vary based on the driving frequency of the second driving mode SDM. For example, when the driving frequency of the second driving mode SDM is 10 Hz and the driving frequency of the second driving mode SDM is 1 Hz, the 2-1 backup period TP1*a*, the 2-2 backup period TP2*a*, and the 2-3 backup period TP3*a* may each have a different duration.

In this case, by increasing the duration of the backup period in the second driving mode SDM, which operates at a low frequency, the issue of the backup period being shorter than one sampling period may be resolved. The adjustment prevents the accumulation of deterioration data for a specific area in the second driving mode SDM. As a result, the afterimage compensation circuit 150*a* can store the deterioration data uniformly across the entire display area DA in the second driving mode SDM. Accordingly, even in the second driving mode SDM, the afterimage compensation circuit 150*a* may accurately compensate for deterioration, thereby improving the reduction of display quality due to afterimages.

As illustrated in FIGS. 11A to 11C, in the multi-frequency mode MFM in which the high-frequency area (e.g., the first display area DA1) and the low-frequency area (e.g., the second display area DA2) exist in one display area DA, the backup period adjustment unit 157 may set the duration of the backup period based on the driving frequency (e.g., the second frequency) of the second display area DA2.

According to an embodiment of the present disclosure, since a storage area for storing information about backup times is provided in the nonvolatile memory, even when the power is turned off, information about the final backup time remains in the nonvolatile memory. When the power is turned on again, the sampling unit may determine the sampling position based on the information about the final backup time. As a result, the sampling unit can subsequently sample the lines that were not sampled due to the power being off. This functionality allows the afterimage compensation circuit to prevent the phenomenon of missing sampling operations in certain areas when operating in a low-frequency mode or a multi-frequency mode.

Although an embodiment of the present disclosure has been described for illustrative purposes, those skilled in the art will recognize that various modifications and substitutions can be made without departing from the scope and spirit of the disclosure as set forth in the accompanying claims. Accordingly, the technical scope of the present disclosure is not limited to the detailed description provided herein.

What is claimed is:

1. A display device comprising:

a display panel that includes a plurality of blocks, wherein a plurality of pixels are arranged in each of the plurality of blocks; and an afterimage compensation circuit configured to receive input image signals and generate compensation image signals by compensating the input image signals based on deterioration information for each of the plurality of blocks, wherein the afterimage compensation circuit includes:

a nonvolatile memory including a first storage area where deterioration data for each of the plurality of blocks is accumulated at each of a plurality of backup times in a preset backup period, and a second storage area where information about a final backup time among the plurality of backup times is stored; and a compensation unit configured to receive accumulated deterioration data stored in the first storage area as the deterioration information and to compensate the input image signals based on the accumulated deterioration data to generate the compensation image signals, wherein deterioration information in any one of the plurality of blocks is the same for each of the plurality of pixels in the any one of the plurality of blocks.

2. The display device of claim 1, wherein the afterimage compensation circuit further includes:

a sampling unit configured to set sampling lines and to sample line image signals from the sampling lines based on the compensation image signals;

a data processing unit configured to generate deterioration data for the sampling lines based on the line image signals; and a volatile memory configured to store the deterioration data.

3. The display device of claim 2, wherein the sampling unit sequentially selects one of the sampling lines in units based on a reference frame.

4. The display device of claim 3, wherein the reference frame includes one frame.

5. The display device of claim 2, wherein the final backup time is a last backup time just before a power is turned off, and wherein, when the power is turned on, the sampling unit sets a reference sampling line among the sampling lines based on the information about the final backup time, and starts a sampling operation from the reference sampling line.

6. The display device of claim 5, wherein the information about the final backup time includes a number of a final reference frame at the final backup time, a number of a final sampling line at the final backup time, or a number of blocks included in the final sampling line.

7. The display device of claim 2, wherein the plurality of blocks are arranged in a first direction and a second direction intersecting the first direction, and the sampling lines extend in the first direction or the second direction.

8. The display device of claim 7, wherein each of the plurality of blocks includes a plurality of sub-blocks arranged in the first direction and the second direction, and wherein the sampling unit samples compensation image signals corresponding to first sub-blocks of blocks included in a first sampling line in a first reference frame as a first line image signal, and samples compensation image signals corresponding to first sub-blocks of blocks included in a second sampling line in a second reference frame as a second line image signal.

9. The display device of claim 2, wherein the deterioration data stored in the volatile memory is backed up to the first storage area of the nonvolatile memory at each of the plurality of backup times.

10. The display device of claim 2, wherein each of the plurality of blocks includes a plurality of sub-blocks, and wherein the sampling unit performs sampling on one sub-block included in each of the plurality of blocks located on a selected sampling line among the sampling lines.

11. The display device of claim 2, wherein the display panel includes:

a first display area operating at a first frequency; and a second display area operating at a second frequency lower than the first frequency.

12. The display device of claim 11, wherein the first display area displays an image in units of first driving frames, the second display area displays an image in units of second driving frames, and each of the second driving frames include a full frame and one or more partial frames.

13. The display device of claim 1, wherein a duration of the backup period varies depending on a time elapsed since a power was turned on.

14. The display device of claim 1, wherein the final backup time is a last backup time just before a power is turned off.

15. A display device comprising:

a display panel that includes a plurality of blocks, wherein a plurality of pixels are arranged in each of the plurality of blocks; and an afterimage compensation circuit configured to receive input image signals and generate compensation image signals by compensating for the input image signals based on deterioration information for each of the plurality of blocks, and wherein the afterimage compensation circuit includes:

a nonvolatile memory where deterioration data for each of the plurality of blocks is accumulated at each of a plurality of backup times in a preset backup period;

a compensation unit configured to receive accumulated deterioration data from the nonvolatile memory as the deterioration information and to compensate for the input image signals based on the accumulated deterioration data to generate the compensation image signal; and a backup period adjustment unit configured to vary a duration of the backup period based on a driving frequency of the display panel, wherein a first driving mode is a driving mode where the display panel operates above a reference frequency, a second diving mode is a driving mode where the display panel operates below the reference frequency, the backup period adjustment unit adjusts the duration of the backup period in the second driving mode to be greater than the duration of the backup period in the first driving mode, and deterioration information in any one of the plurality of blocks is the same for each of the plurality of pixels in the any one of the plurality of blocks.

16. The display device of claim 15, wherein the display panel includes:

a first display area operating at a first frequency; and a second display area operating at a second frequency lower than the first frequency, and wherein the first display area displays an image in units of first driving frames, the second display area displays an image in units of second driving frames, and each of the second driving frames include a full frame and one or more partial frames.

17. The display device of claim 16, wherein the backup period adjustment unit sets the duration of the backup period based on the second frequency.

18. The display device of claim 15, wherein the afterimage compensation circuit further includes:

a sampling unit configured to set sampling lines and to sample line image signals corresponding to the sampling lines by using the compensation image signals;

a data processing unit configured to generate deterioration data corresponding to the sampling lines by using the line image signals; and a volatile memory configured to store the deterioration data.

19. The display device of claim 18, wherein the deterioration data stored in the volatile memory is backed up to the nonvolatile memory at each of the backup times.

20. An electronic device comprising:

a display device comprising:

a display panel that includes a plurality of blocks, wherein a plurality of pixels are arranged in each of the plurality of blocks; and an afterimage compensation circuit configured to receive input image signals and generate compensation image signals by compensating the input image signals based on deterioration information for each of the plurality of blocks, and wherein the afterimage compensation circuit includes:

a nonvolatile memory including a first storage area where deterioration data for each of the plurality of blocks is accumulated at each of a plurality of backup times in a preset backup period, and a second storage area where information about a final backup time among the plurality of backup times is stored; and a compensation unit configured to receive accumulated deterioration data stored in the first storage area as the deterioration information and to compensate the input image signals based on the accumulated deterioration data to generate the compensation image signals, wherein deterioration information in any one of the plurality of blocks is the same for each of the plurality of pixels in the any one of the plurality of blocks.

* * * * *